(12) United States Patent
Nakamura

(10) Patent No.: US 8,698,907 B2
(45) Date of Patent: Apr. 15, 2014

(54) IMAGE CAPTURE APPARATUS

(75) Inventor: Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 148 days.

(21) Appl. No.: 13/473,082

(22) Filed: May 16, 2012

(65) Prior Publication Data

US 2012/0287313 A1 Nov. 15, 2012

Related U.S. Application Data

(63) Continuation of application No. PCT/JP2010/006123, filed on Oct. 15, 2010.

(30) Foreign Application Priority Data

Nov. 20, 2009 (JP) ................................ 2009-265699

(51) Int. Cl.
*H04N 5/225* (2006.01)

(52) U.S. Cl.
USPC ...................... 348/220.1; 348/239; 348/222.1

(58) Field of Classification Search
USPC .................. 348/220.1, 239, 222.1; 250/208.1
See application file for complete search history.

(56) References Cited

U.S. PATENT DOCUMENTS

| | | | |
|---|---|---|---|
| 6,377,301 B1* | 4/2002 | Hieda | ....................... 348/231.99 |
| 7,400,353 B2 | 7/2008 | Hatano | |
| 7,859,447 B2 | 12/2010 | Nitta et al. | |
| 7,916,362 B2 | 3/2011 | Kijima et al. | |
| 7,944,486 B2 | 5/2011 | Tanaka et al. | |
| 2005/0068455 A1 | 3/2005 | Hatano | |
| 2006/0012507 A1 | 1/2006 | Nitta et al. | |
| 2007/0247538 A1* | 10/2007 | Fujita et al. | .................... 348/314 |
| 2007/0268533 A1 | 11/2007 | Kijima et al. | |
| 2008/0088725 A1 | 4/2008 | Matsunaga | |
| 2008/0309776 A1* | 12/2008 | Suzuki | ........................ 348/220.1 |
| 2009/0207288 A1 | 8/2009 | Tanaka et al. | |
| 2010/0157113 A1* | 6/2010 | Kobayashi | .................... 348/243 |
| 2010/0328485 A1 | 12/2010 | Imamura et al. | |
| 2011/0211109 A1 | 9/2011 | Compton et al. | |

FOREIGN PATENT DOCUMENTS

| | | |
|---|---|---|
| JP | 2005-107252 | 4/2005 |
| JP | 2007-19641 | 1/2007 |
| JP | 2008-98971 | 4/2008 |
| JP | 4289244 | 7/2009 |

(Continued)

OTHER PUBLICATIONS

International Search Report issued Jan. 18, 2012 in International (PCT) Application No. PCT/JP2010/006123.

*Primary Examiner* — Tuan Ho
*Assistant Examiner* — Zhenzhen Wu
(74) *Attorney, Agent, or Firm* — Wenderoth, Lind & Ponack, L.L.P.

(57) ABSTRACT

Provided is an image capture apparatus which allows concurrent output of high resolution video images and high resolution still images even if the number of readout pixels is reduced. In the image capture apparatus, a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals.

17 Claims, 32 Drawing Sheets

(56) References Cited

FOREIGN PATENT DOCUMENTS

| | | |
|---|---|---|
| JP | 2009-246745 | 10/2009 |
| JP | 2009-272820 | 11/2009 |
| JP | 2009-538563 | 11/2009 |
| WO | 2007/139675 | 12/2007 |

* cited by examiner

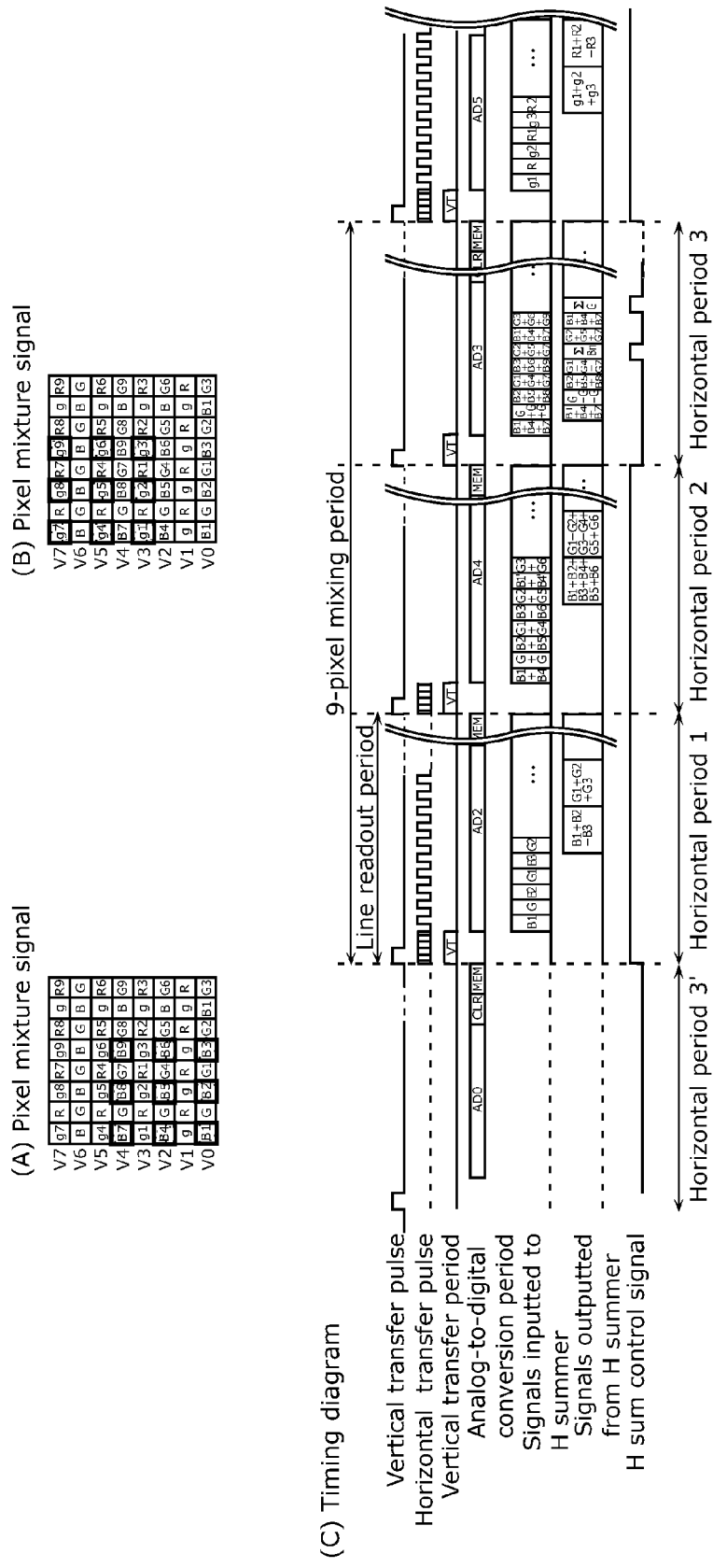

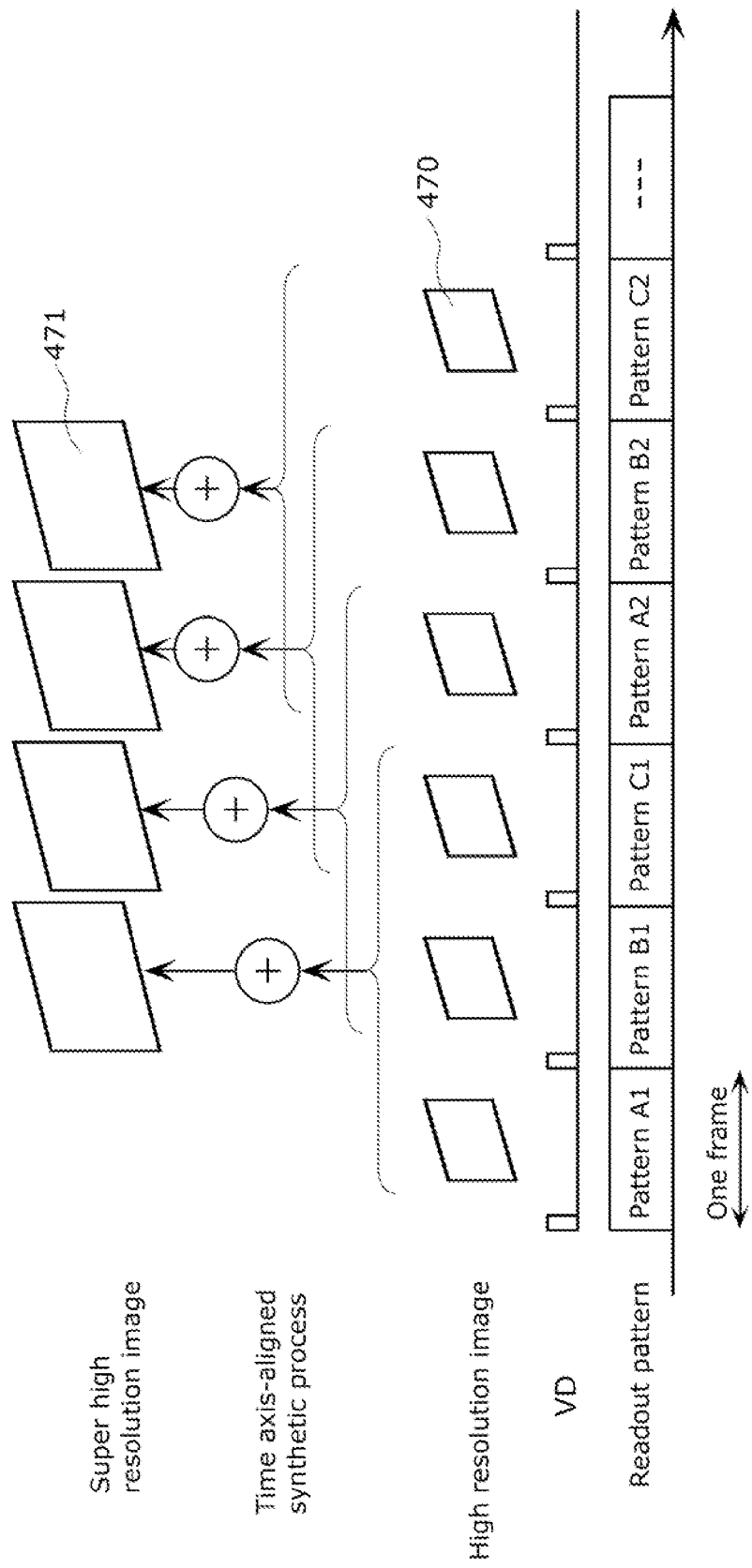

FIG. 18B

FIG. 18C
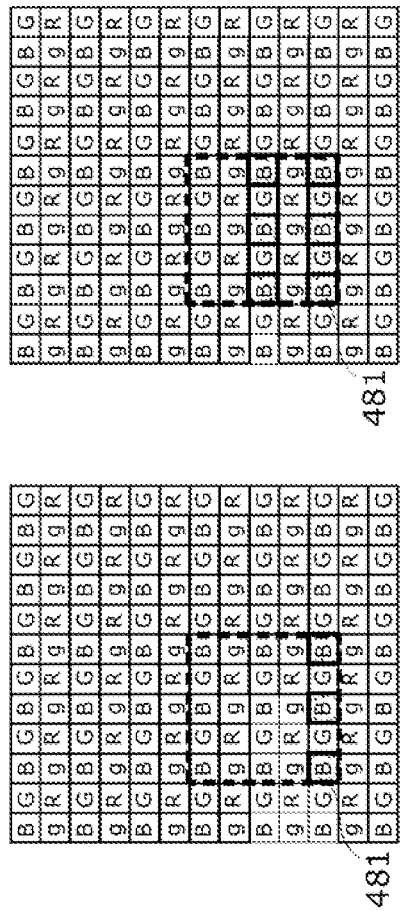
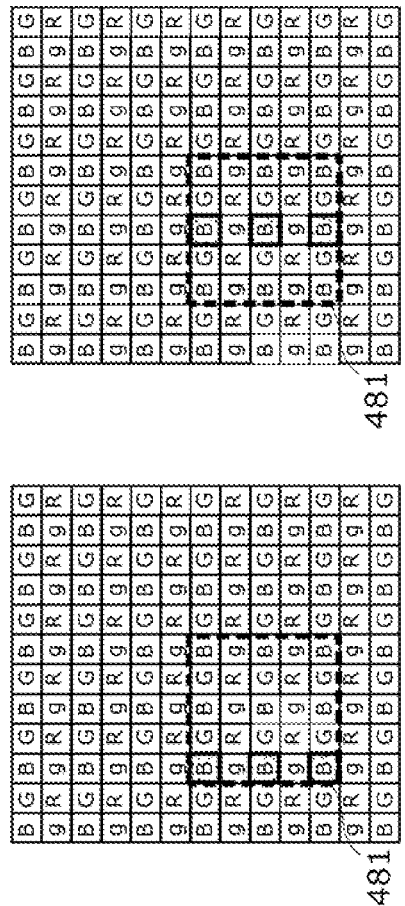
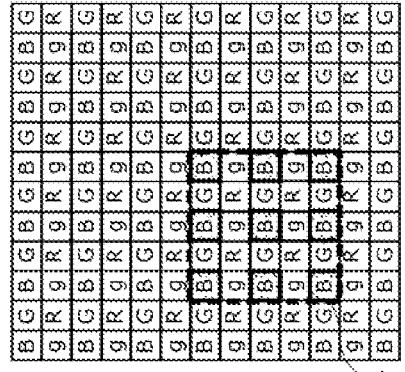

IMAGE CAPTURE APPARATUS

CROSS REFERENCE TO RELATED APPLICATION

This is a continuation application of PCT patent application Ser. No. PCT/JP2010/006123 filed on Oct. 15, 2010, designating the United States of America, which is based on and claims priority of Japanese Patent Application No. 2009-265699 filed on Nov. 20, 2009. The entire disclosures of the above-identified applications, including the specifications, drawings and claims are incorporated herein by reference in their entirety.

Technical Field

The present invention relates to an image capture apparatus for capturing still images and video images.

Background Art

Recent development in semiconductor technology achieves a tremendous increase in number of pixels in photoelectric conversion element arrays of solid-state imaging devices. High pixel resolution is obtained when the number of pixels is sufficiently large. Upon capturing still images, the capturing is performed using pixel data of all pixels in the photoelectric conversion element array. This is the all pixel readout mode and wherein the pixel data read out from the photoelectric conversion element array is subsequently outputted pixel by pixel for all pixels. This allows capturing high definition still images.

On the other hand, there are image capture apparatuses configured to be switchable between a still mode and a video record mode. At present, there is a certain limitation in operation speed of digital signal processing circuitry such as DSP, and additionally, it is difficult in terms of power consumption to capture video images in video recording in the all pixel readout mode which is the same mode as for capturing still images. For video recording, it is common to perform pixel data processing in which a plurality of pixel signals is mixed and decimated to increase the number of frames per unit time. This is a vertical-horizontal mixed pixel readout mode (for example, see PTLs 1 and 2).

In the vertical-horizontal mixed pixel readout mode, for the pixel data read out from the photoelectric conversion element array, a plurality of pixels in the vertical and horizontal directions of the array are mixed and the mixed pixel data is outputted as a unit of pixel data. This increases the number of frames per unit time, and allows video images to be captured smoothly at high speed even using an image capture apparatus incorporating a photoelectric conversion element array having a high pixel resolution.

The operation in the mixed pixel readout mode as described above is the area of strength particularly for MOS (Metal Oxide Semiconductor) image sensors. This is because the MOS image sensor does not require transfer of charges due to the movement of a potential well as required in CCD (Charge Coupled Device) image sensors, and is able to read out pixel data on an arbitrary line using a signal line (wire).

Moreover, in image capture apparatuses which include monitor screens, such as LCD display devices, optical system auto focusing is performed. In general, in an initial state when the power is turned on, a subject image is shown on the monitor screen in a video mode. This is what is known as a monitor mode. The monitor mode supports video images, and has the vertical-horizontal mixed pixel readout mode applied thereto in which the pixels are decimated. When a shutter button is pressed in the monitor mode for capturing a still image, the optical system auto focusing is activated when a shutter button is half-pressed, and, in a focused (just focused) state, the shutter is released (the shutter button is fully pressed) and the mode changes to the all pixel readout mode, thereby capturing a still image.

CITATION LIST

Patent Literature

[PTL 1] Japanese Unexamined Patent Application Publication No. 2005-107252
[PTL 2] Japanese Patent No. 4289244

SUMMARY OF INVENTION

Technical Problem

In the conventional image capture apparatus, exposure timings in video image capturing and still image capturing are, of course, different, and thus it is impossible to capture a same subject image in focus as a video image and a still image.

On the other hand, users feel increased desires to capture the movement of the subject as high definition still images along with recording it as video images. Therefore, it is required that the conventional image capture apparatus performs processing while switching between a pixel mixing mode for video images and a pixel non-mixing mode for still images for every frame, for example. This causes suspension of video image recording while a still image is being captured or an increase in drive frequency of an image processing circuit.

In response to these problems, pixel signals of a plurality of pixels of the solid-state imaging device are mixed and the resultant signals are outputted in the manner as described above, thereby reducing the number of readout pixels to reduce the drive frequency of the image capture apparatus.

Specific description is as follows. FIG. 26 is a schematic block diagram of an image capture apparatus 1000 which includes an imaging lens 1001 and a camera body 1002. The camera body 1002 includes a solid-state imaging device 1003 and a processing unit 1010. A subject image imaged by the imaging lens 1001 is converted into pixel signals by the solid-state imaging device 1003 and the pixel signals are sent to the processing unit 1010. An image processing unit 1012 provided in the processing unit 1010 converts the pixel signals into image signals and the image signals are sent to an image compression unit 1013. The image compression unit 1013 compression transforms the image signals into JPEG data for still image or into MPEG2 data or MPEG4 data for video image, and stores the resultant data in a storage unit 1016. Depending on an operation, the image processing unit 1012 uses a temporary storage unit 1015 as a work memory area.

A configuration of the solid-state imaging device 1003 is shown in FIG. 27. In the solid-state imaging device 1003, a pixel portion 1021 is provided in which a plurality of pixels 1020 each including a photoelectric conversion element are arranged in a horizontal-vertical array, and an analog-to-digital conversion circuit 1025, a V summer 1026, and a line memory 1027 are provided for the pixels 1020 on each vertical column. The analog-to-digital conversion circuit 1025, the V summer 1026, and the line memory 1027 may be a counter-based analog-to-digital converter and a line memory.

The pixel signals generated from the pixels 1020 are outputted on a row by row basis by a vertical drive circuit 1022 and sequentially undergo analog-to-digital conversion, held by the line memory 1027 via the V summer 1026, and sequentially outputted from the solid-state imaging device 1003 by a horizontal drive circuit 1023 through an H summer 1028.

In capturing still images, operations of the H summer 1028 and the V summer 1026 are under suspension and the pixel signal for each pixel 1020 is outputted from the solid-state imaging device 1003. In capturing video images, the H summer 1028 and the V summer 1026 are in operation and a pixel mixture signal which is obtained by summing the pixel signals in an arbitrary pixel region in the horizontal and vertical directions is outputted.

Figure 28:
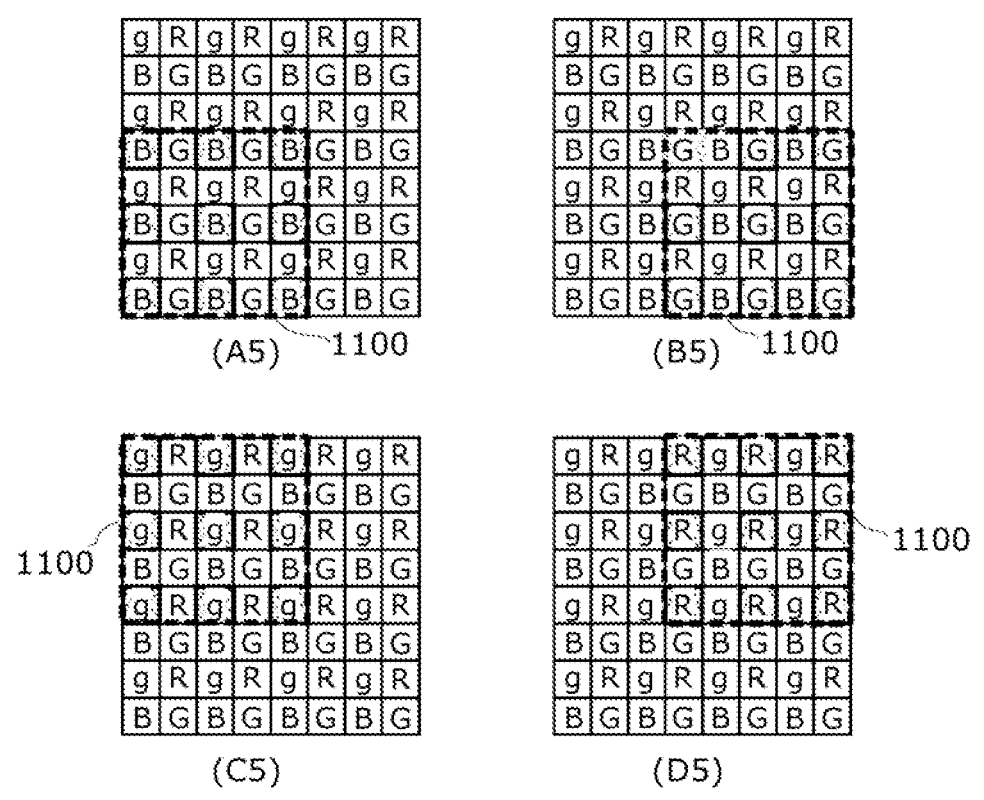

FIG. 28 shows an example of readout of the pixel signals of the solid-state imaging device 1003 in the 9-pixel mixing mode when capturing video images. Here, a solid-state imaging device which has three color filters R, G, and B (g represents G on a column for R) in the Bayer array is shown. Moreover, timing diagrams showing operation timings of the solid-state imaging device are shown in FIG. 29.

In the 9-pixel mixing mode, for example, upon readout of pixels B shown in (A5) of FIG. 28, in a readout region 1100 enclosing nine pixels corresponding to the color filter B, pixel signals for three pixels having a same color in the vertical direction are outputted and mixed on a column by column basis by the V summer 1026, in accordance with the timing diagram of a pixel mixing mode shown in FIG. 29. The obtained pixel signal is referred to as a vertical pixel mixture signal. The vertical pixel mixture signal is transferred to the line memory 1027. The vertical pixel mixture signal for each column which has been transferred to the line memory is summed by the H summer 1028, and a pixel mixture signal in which a total of nine pixels are summed is generated, and outputted from the solid-state imaging device 1003. Moreover, as shown in (B5), (C5), and (D5) of the figure, with respect to pixels corresponding to the arrangement of other color filters, pixel mixture signals of nine pixels are generated and outputted from the solid-state imaging device 1003 in the same manner.

Moreover, in the image capture apparatus 1000 shown in FIG. 26, the pixel mixture signal outputted from the solid-state imaging device 1003 is processed by a control unit 1011 as follows. In capturing video images, the control unit 1011 sends the solid-state imaging device 1003, the image processing unit 1012, and the image compression unit 1013 a control signal for video image to perform, using the 9-pixel mixture signal, image processing and compressed recording. Moreover, in capturing a still image, the control unit 1011 sends the solid-state imaging device 1003, the image processing unit 1012, and the image compression unit 1013 a control signal for still image in the same manner as sending the control signal for video image to perform the image processing and the compressed recording after suspending the pixel mixing.

As described above, in the conventional image capture apparatus, the pixel signals of the plurality of pixels of the solid-state imaging device are mixed and the resultant signals are outputted, thereby reducing the number of readout pixels and the drive frequency of the image capture apparatus. However, reducing the number of pixels results in deterioration of resolution, which prevents the image capture apparatus from supporting the high pixel resolutions.

The present invention is made in view of the above problems and an object of the present invention is to provide an image capture apparatus which allows output of high resolution video images and high resolution still images even if the number of readout pixels is reduced.

Solution to Problem

To solve the above problems, an image capture apparatus according to one embodiment of the present invention includes: a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals; a first image processing unit configured to generate a first image from the first pixel mixture signals; a second image processing unit configured to generate a second image from the second pixel mixture signals; a third image processing unit configured to generate a third image from the third pixel mixture signals; and a fourth image processing unit configured to generate a fourth image, which is a high resolution image, from at least two images selected from among the first image, the second image, and the third image, wherein the second regions are disposed in a column direction in the first region and each second region has, in a row direction, a same number of pixels as a number of pixels in the row direction in the first region, and the third regions are disposed in the row direction in the first region and each third region has, in the column direction, a same number of pixels as a number of pixels in the column direction in the first region.

According to the above configuration, in the solid-state imaging device, low resolution pixel mixture signals (the first pixel mixture signals) for video image, and, among high resolution pixel mixture signals for still image, horizontal pixel mixture signals (the second pixel mixture signals) that have high vertical resolution and vertical pixel mixture signals (the third pixel mixture signals) that have high horizontal resolution among high resolution pixel mixture signals for still image can concurrently be obtained. This allows not only the low resolution pixel mixture signals for video image but also the high resolution pixel mixture signals for still image to be acquired from the pixel signals even if the number of pixel signals outputted from the solid-state imaging device is reduced. Thus, the high resolution video images and high resolution still images can concurrently be outputted without increasing the drive frequency of the image capture apparatus even if the number of readout pixels is reduced. Moreover, since the video image and the still image can concurrently be outputted from the low resolution pixel mixture signal and the high resolution pixel mixture signal, respectively, a still image can be obtained at any timing while the video image is being captured.

Moreover, the low resolution pixel mixture signals and the high resolution pixel mixture signals are outputted from the solid-state imaging device in a manner sharing portions of signals, and thus the number of signals outputted from the solid-state imaging device can be reduced. This reduces capacity of a temporary storage unit for image processing, thereby allowing reduction in drive frequency of an image processing circuit while contributing to the miniaturization of the capture device. Thus, low power consumption and reduction in circuit size are possible.

Here, the solid-state imaging device may: generate fourth pixel mixture signals each obtained by mixing at least two of the second pixel mixture signals; and concurrently output the one of the first pixel mixture signals, at least one of the second pixel mixture signals, at least one of the third pixel mixture signals, and at least one of the fourth pixel mixture signals.

Moreover, the solid-state imaging device may: generate fifth pixel mixture signals each obtained by mixing at least two of the third pixel mixture signals; and concurrently output the one of the first pixel mixture signals, at least one of the second pixel mixture signals, at least one of the third pixel mixture signals, and at least one of the fifth pixel mixture signals.

Moreover, the solid-state imaging device may: generate at least one of fourth pixel mixture signals each obtained by mixing at least two of the second pixel mixture signals; generate at least one of fifth pixel mixture signals each obtained by mixing at least two of the third pixel mixture signals; and concurrently output the one of the first pixel mixture signals, at least one of the second pixel mixture signals, at least one of the third pixel mixture signals, at least one of the fourth pixel mixture signals, and at least one of the fifth pixel mixture signals.

According to the above configuration, the number of low resolution pixel mixture signals outputted from the solid-state imaging device can further be reduced. This allows the high resolution image to be acquired from even lower resolution pixel mixture signals.

Here, the image capture apparatus may include a pixel reconstruction unit configured to generate, from the one of the first pixel mixture signals, the second pixel mixture signals, and the third pixel mixture signals that are outputted, the second pixel mixture signals and the third pixel mixture signals that are not outputted.

Moreover, the image capture apparatus may include a pixel reconstruction unit configured to generate, from the one of the first pixel mixture signals, the second pixel mixture signals, the third pixel mixture signals, and the fourth pixel mixture signals that are outputted, the second pixel mixture signals and the third pixel mixture signals that are not outputted.

Moreover, the image capture apparatus may include a pixel reconstruction unit configured to generate, from the one of the first pixel mixture signals, the second pixel mixture signals, the third pixel mixture signals, and the fifth pixel mixture signals that are outputted, the second pixel mixture signals and the third pixel mixture signals that are not outputted.

Moreover, the image capture apparatus may include a pixel reconstruction unit configured to generate, from the one of the first pixel mixture signals, the second pixel mixture signals, the third pixel mixture signals, the fourth pixel mixture signals, and the fifth pixel mixture signals that are outputted, the second pixel mixture signals and the third pixel mixture signals that are not outputted.

According to the above configuration, the pixel mixture signals that are not outputted are generated from the pixel mixture signals that are outputted from the solid-state imaging device. Thus, the number of pixel mixture signals outputted from the solid-state imaging device can be reduced.

Here, the fourth image processing unit may include: a first enlargement unit configured to enlarge the second image inputted from the second image processing unit, to generate a first enlarged image; a second enlargement unit configured to enlarge the third image inputted from the third image processing unit, to generate a second enlarged image; a first contrast calculation unit configured to calculate, with respect to pixels of the first enlarged image, first contrast of image signals of a pixel and pixels surrounding the pixel; and a second contrast calculation unit configured to calculate, with respect to pixels of the second enlarged image, second contrast of image signals of a pixel and pixels surrounding the pixel, the first enlarged image and the second enlarged image may have a same size, and based on a contrast value of the first contrast of a pixel at each one of predetermined positions in the first enlarged image and a contrast value of the second contrast of a pixel at a position which corresponds to the one predetermined position and is in the second enlarged image, an image signal of the first enlarged image or the second enlarged image that has a larger contrast value may be selected to generate a new high resolution image.

Moreover, the fourth image processing unit may include: a first enlargement unit configured to enlarge the second image outputted from the second image processing unit, to generate a first enlarged image; a second enlargement unit configured to enlarge the third image outputted from the third image processing unit, to generate a second enlarged image; a first contrast calculation unit configured to calculate, with respect to pixels of the first enlarged image, first contrast of image signals of a pixel and pixels surrounding the pixel; and a second contrast calculation unit configured to calculate, with respect to pixels of the second enlarged image, second contrast of image signals of a pixel and pixels surrounding the pixel, the first enlarged image and the second enlarged image may have a same size, and in accordance with a ratio between the first contrast of a pixel at each one of predetermined positions in the first enlarged image and the second contrast of a pixel at a position which corresponds to the predetermined position and is in the second enlarged image, an image signal of the first enlarged image and an image signal of the second enlarged image may be mixed to generate a new high resolution image.

Moreover, based on a contrast value Ca of the first contrast and a contrast value Cb of the second contrast, an image signal Pa of the first enlarged image and an image signal Pb of the second enlarged image, the fourth image processing unit may be configured to generate an image signal Pnew for a high resolution image satisfying: Pnew=T1[Ca, Cb]×Pa+T2[Ca, Cb]×Pb, where T1[Ca, Cb]+T2[Ca, Cb]=1, and T1 and T2 are constants that depend on Ca and Cb, respectively.

According to the above configuration, the high resolution image can be generated from the first contrast and the second contrast that are obtained from the second enlarged image and the third enlarged image, respectively. Thus, a highly-accurate high resolution image can be obtained.

Here, in the solid-state imaging device, given that M is a positive integer represented by n×α, n is an integer greater than or equal to 1, and α is an integer greater than or equal to 2, the first region may be formed of M×M pixels, the second region may be formed of n×M pixels, and the third region may be formed of M×n pixels.

According to the above configuration, the pixel mixture signals that are decimated in the row and column directions of the pixel portion in the same ratio can be obtained.

Here, when a plurality of images is captured for frames continuous in time, a position of each first region in each image may be sequentially changed for each frame.

According to the above configuration, by subsequently shifting the position of each first region for each frame, generation of a super high resolution image is possible.

Here, the first pixel mixture signals, the second pixel mixture signals, and the third pixel mixture signals may be each generated for each one of colors.

According to the above configuration, in the image capture apparatus which includes a color filter for each pixel, not only the low resolution pixel mixture signals for video image but also the high resolution pixel mixture signals for still image can be acquired even if the number of pixel signals outputted from the solid-state imaging device is reduced.

Moreover, to solve the above problems, an image capture apparatus according to one embodiment of the present invention includes: a solid-state imaging device which includes a plurality of pixels disposed in rows and columns, generates: first pixel mixture signals each obtained by mixing pixel signals for a first region including a predetermined number of the pixels; second pixel mixture signals each obtained by mixing, pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals; a first image processing unit configured to generate a first image from the first pixel mixture signals; a second image processing unit configured to generate a second image from the second pixel mixture signals; a third image processing unit configured to generate a third image from the third pixel mixture signals; a first image compression unit configured to compress the first image; a second image compression unit configured to compress the second image; and a third image compression unit configured to compress the third image, wherein the second regions are disposed in a column direction in the first region and each second region has, in a row direction, a same number of pixels as a number of pixels in the row direction in the first region, and the third regions are disposed in the row direction in the first region and each third region has, in the column direction, a same number of pixels as a number of pixels in the column direction in the first region.

According to the above configuration, not only the low resolution pixel mixture signals for video image but also the high resolution pixel mixture signals for still image can be acquired even if the number of pixel signals outputted from the solid-state imaging device is reduced. Moreover, the first image compression unit, the second image compression unit, and the third image compression unit compression encode the first image, the second image, and the third image that are generated by the first image processing unit, the second image processing unit, and the third image processing unit, respectively. Thus, the fourth image is not generated. Moreover, a total image size combining sizes of the second image and the third image is smaller than the size of the fourth image. Thus, the images can be stored in a greatly reduced storage density.

Moreover, to solve the above problems, an image capture apparatus according to one embodiment of the present invention includes: a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals; a first image processing unit configured to generate a first image from the first pixel mixture signals; a second image processing unit configured to generate a second image from the second pixel mixture signals; a third image processing unit configured to generate a third image from the third pixel mixture signals; a first compression unit configured to compress a first differential signal which is a difference between the first image and the second image; and a second compression unit configured to compress a second differential signal which is a difference between the first image and the third image, wherein the second regions are disposed in a column direction in the first region and each second region has, in a row direction, a same number of pixels as a number of pixels in the row direction in the first region, and the third regions are disposed in the row direction in the first region and each third region has, in the column direction, a same number of pixels as a number of pixels in the column direction in the first region.

According to the above configuration, not only the low resolution pixel mixture signals for video image but also the high resolution pixel mixture signals for still image can be acquired even if the number of pixel signals outputted from the solid-state imaging device is reduced. Moreover, the first differential signal which is the difference between the first image and the second image and the second differential signal which is the difference between the first image and the third image are each compressed, thereby eliminating the redundancy of the information (DC component) commonly included in the first image, the second image, and the third image. Thus, the compression efficiency increases allowing the video images and the still images to be concurrently and accurately obtained from the low resolution pixel mixture signals and the high resolution pixel mixture signals, respectively.

Moreover, to solve the above problems, an image capture apparatus according to one embodiment of the present invention includes: a solid-state imaging device which includes a plurality of pixels disposed in rows and columns, a pixel mixing unit configure to generate from pixel signals outputted from the solid-state imaging device: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals; a first image processing unit configured to generate a first image from the first pixel mixture signals; a second image processing unit configured to generate a second image from the second pixel mixture signals; a third image processing unit configured to generate a third image from the third pixel mixture signals; and a fourth image processing unit configured to generate a fourth image, which is a high resolution image, from at least two images selected from among the first image, the second image, and the third image, wherein the second regions are disposed in a column direction in the first region and each second region has, in a row direction, a same number of pixels as a number of pixels in the row direction in the first region, and the third regions are disposed in the row direction in the first region and each third region has, in the column direction, a same number of pixels as a number of pixels in the column direction in the first region.

According to the above configuration, not only the low resolution pixel mixture signals for video image but also the high resolution pixel mixture signals for still image can be acquired even if the number of pixel signals outputted from the solid-state imaging device is reduced. In addition, this obviates the need of performing the pixel mixing in the solid-state imaging device, thereby achieving reduced throughput, decreased power consumption, and miniaturization of the solid-state imaging device even in image capture apparatuses using solid-state imaging devices that have no pixel mixing functionality.

Advantageous Effects of Invention

According to the present invention, high resolution video images and high resolution still images can be outputted even if the number of pixels to be read out is reduced.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 3 is a diagram showing arrays of mixed pixels of pixel mixture signals outputted by a solid-state imaging device;

FIG. 4 is a diagram showing the arrays of mixed pixels of pixel mixture signals obtained from the solid-state imaging device;

FIG. 5A is a diagram showing a combination of pixel mixture signals for generating a second image;

FIG. 5B is a diagram showing a combination of pixel mixture signals for generating a third image;

FIG. 8A is a timing diagram showing an example of an operation of outputting a pixel mixture signal;

FIG. 10 is a diagram showing arrays of mixed pixels of pixel mixture signals outputted by the solid-state imaging device;

FIG. 11 is a diagram showing the arrays of mixed pixels of pixel mixture signals obtained from the solid-state imaging device;

FIG. 18A is a diagram showing an operation for generating a super high resolution image;

FIG. 18B is a diagram showing arrays of mixed pixels of pixel mixture signals outputted by the solid-state imaging device;

FIG. 18C is a diagram showing the arrays of mixed pixels of pixel mixture signals outputted by the solid-state imaging device;

FIG. 18D is a diagram showing the arrays of mixed pixels of pixel mixture signals outputted by the solid-state imaging device;

FIG. 23 is a diagram showing a combination of pixel mixture signals according to an embodiment 8 of the present invention;

FIG. 24 is a diagram showing arrays of mixed pixels of pixel mixture signals outputted by the solid-state imaging device;

FIG. 25 is a diagram showing the arrays of mixed pixels of pixel mixture signals obtained from the solid-state imaging device;

FIG. 28 is a diagram showing a conventional combination of pixel mixture signals.

DESCRIPTION OF EMBODIMENTS

Hereinafter, embodiments of an image capture apparatus according to the present invention will be described with reference to the accompanying drawings, using a digital still camera by way of example. The present invention will be described using the following embodiments with the accompanying drawings for illustration purposes only, and the present invention is not limited to the embodiments.

(Embodiment 1)

First, a configuration of an image capture apparatus according to an embodiment 1 which is one embodiment of the present invention will be described. In the present embodiment, an image capture apparatus will be described which includes: a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals; a first image processing unit configured to generate a first image from the first pixel mixture signals; a second image processing unit configured to generate a second image from the second pixel mixture signals; a third image processing unit configured to generate a third image from the third pixel mixture signals; and a fourth image processing unit configured to generate a fourth image, which is a high resolution image, from at least two images selected from among the first image, the second image, and the third image, wherein the second regions are disposed in a column direction in the first region and each second region has, in a row direction, a same number of pixels as a number of pixels in the row direction in the first region, and the third regions are disposed in the row direction in the first region and each third region has, in the column direction, a same number of pixels as a number of pixels in the column direction in the first region.

Figure 1:
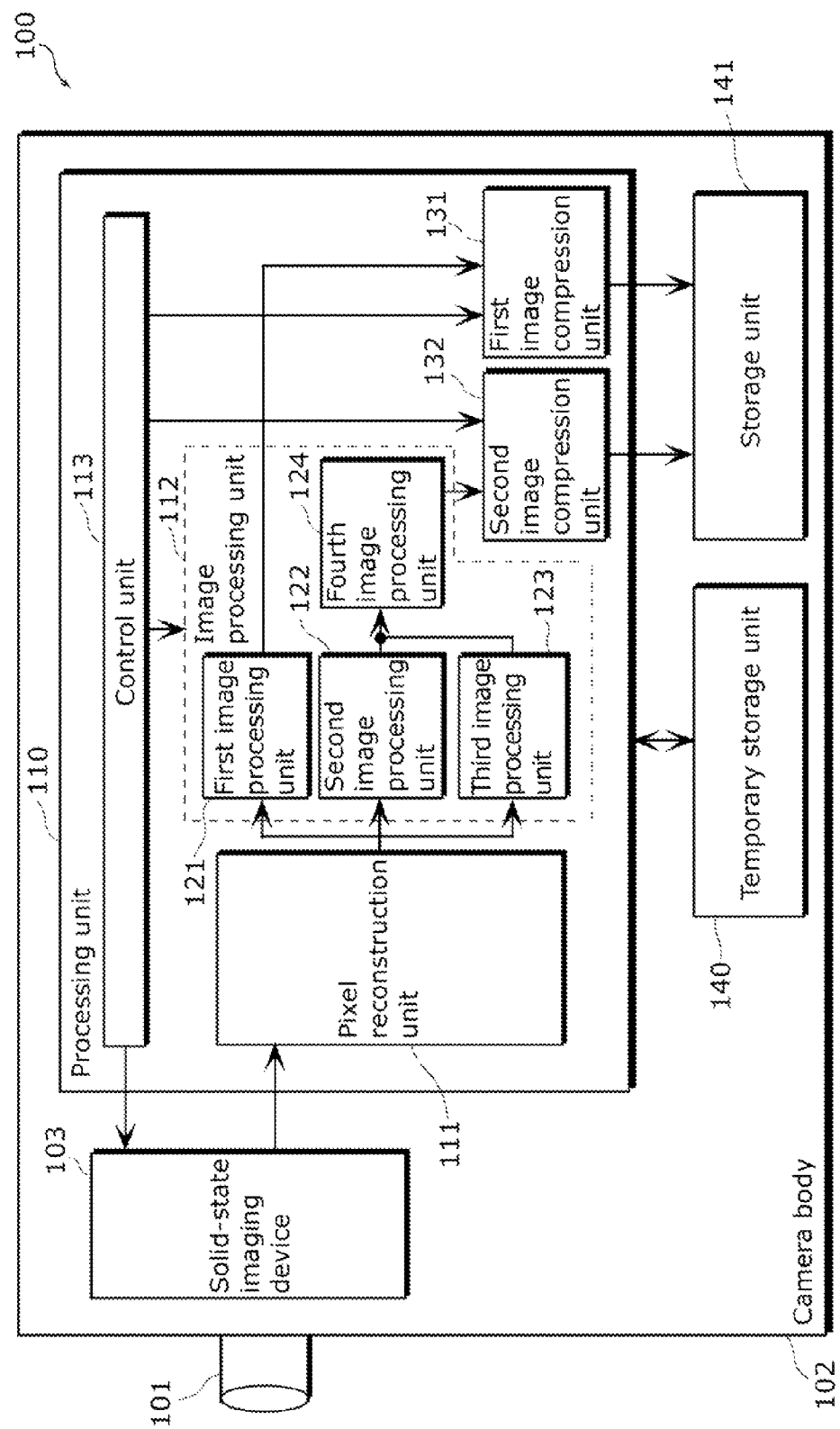
FIG. 1 is a block diagram of an image capture apparatus according to an embodiment 1 of the present invention.
Figure 2:
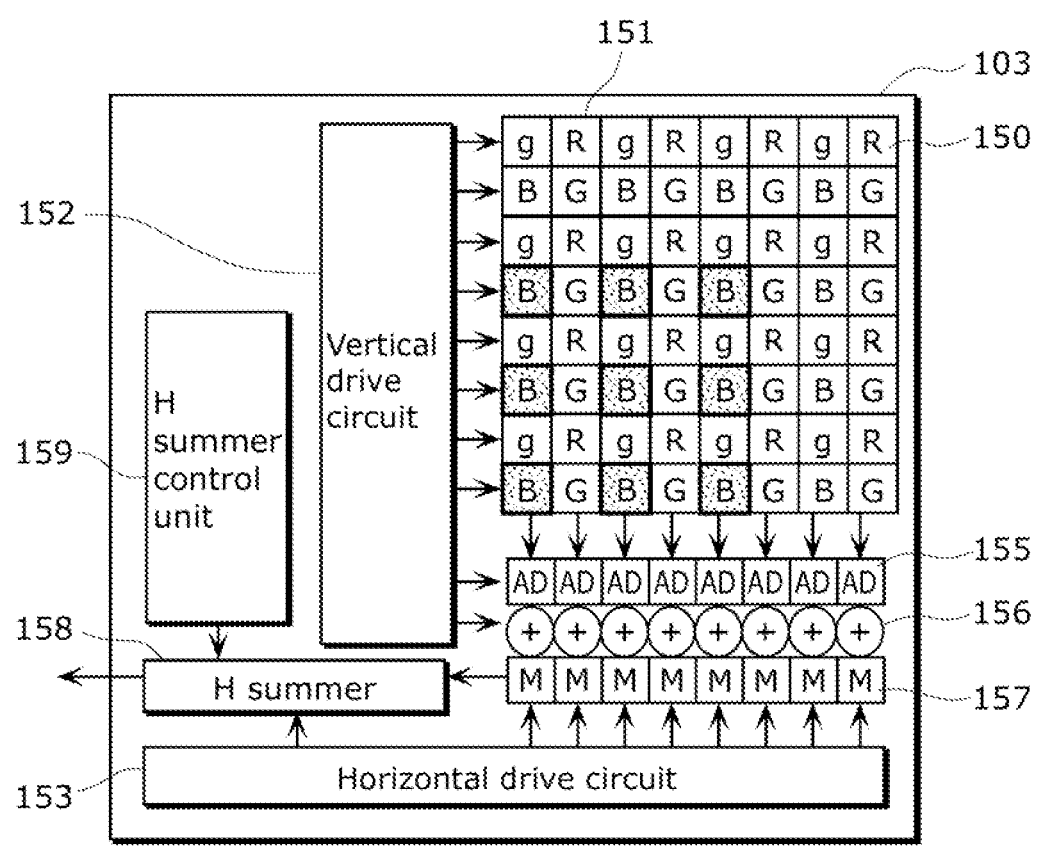
FIG. 2 is a block diagram of a solid-state imaging device shown in FIG. 1.

An image capture apparatus 100 and a solid-state imaging device 103 according to the present embodiment are shown in FIG. 1 and FIG. 2, respectively.

As shown in FIG. 1, the image capture apparatus 100 includes an imaging lens 101 and a camera body 102. Moreover, the camera body 102 includes the solid-state imaging device 103, a processing unit 110, a temporary storage unit 140, and a storage unit 141. A subject image imaged by the imaging lens 101 is converted into electric signals (hereinafter, referred to as pixel signals) by the solid-state imaging device 103 and the pixel signals are sent to the processing unit 110.

A configuration of the solid-state imaging device 103 is shown in FIG. 2. In the figure, a solid-state imaging device which has three color filters R (red), G (green), and B (blue) in the Bayer array is shown (g represents G on a column for R). As shown in the figure, the solid-state imaging device 103 is provided with a pixel portion 151 in which a plurality of pixels 150 each having a photoelectric conversion element are arranged in a horizontal-vertical array (in rows and columns), and the solid-state imaging device 103 also includes an analog-to-digital conversion circuit 155, a V summer 156, and a line memory 157 on each vertical column. For example, a counter-based analog-to-digital converter and a line memory are used as the analog-to-digital conversion circuit 155, the V summer 156, and the line memory 157. The pixel signals generated from the pixels 150 are sequentially outputted by a vertical drive circuit 152 on a row by row basis, undergo analog-to-digital conversion by the analog-to-digital conversion circuit 155, and are sequentially outputted from the solid-state imaging device 103 by a horizontal drive circuit 153 via an H summer 158. Then, an H summer control unit 159 determines, in units of horizontal transfer pixel and vertical transfer pixel, whether to perform horizontal summing in the H summer 158.

Here, the solid-state imaging device 103 generates: the first pixel mixture signals each obtained by mixing the pixel signals for each first region including a predetermined number of pixels 150 in the pixel portion 151; the second pixel mixture signals each obtained by mixing the pixel signals for each second region in the first region; and the third pixel mixture signals each obtained by mixing the pixel signals for each third region in the first region, and outputs, to send to a pixel reconstruction unit 111, one of the first pixel mixture signals, and at least one of the second pixel mixture signals and at least one of the third pixel mixture signals that are in each first region. The first region, the second region, and the third region will be described in detail.

The processing unit 110 includes the pixel reconstruction unit 111, an image processing unit 112, a control unit 113, a first image compression unit 131, and a second image compression unit 132.

The control unit 113 controls operations of the solid-state imaging device 103, the image processing unit 112, the first image compression unit 131, and the second image compression unit 132.

Moreover, the temporary storage unit 140 is a work memory and used for temporarily storing therein the image signals in generating an image by the processing unit 110. Moreover, the storage unit 141 stores therein the image generated by the processing unit 110.

The pixel reconstruction unit 111 reconstructs the first pixel mixture signals, the second pixel mixture signals, and the third pixel mixture signals, which are outputted from the solid-state imaging device 103, for a first image (a low resolution image) which has a low resolution, a second image (a vertical resolution image) which has a low resolution in the row direction, and a third image (a horizontal resolution image) which has a low resolution in the column direction, respectively, and outputs the resultant pixel mixture signals.

The image processing unit 112 includes a first image processing unit 121, a second image processing unit 122, a third image processing unit 123, and a fourth image processing unit 124. The first image processing unit 121 converts the first pixel mixture signals, which are reconstructed and outputted from the pixel reconstruction unit 111, into first image signals for constructing the first image and sends the first image signals to the first image compression unit 131. The first image compression unit 131 compression transforms the first image signals into JPEG data for still image or into MPEG2 data or MPEG4 data for video image and stores the resultant data in the storage unit 141. That is, the first image processing unit 121 generates the first image from the first pixel mixture signals.

The second image processing unit 122 converts the second pixel mixture signals, which are outputted from the pixel reconstruction unit 111, into second image signals for constructing the second image and sends the second image signals to the fourth image processing unit 124. That is, the second image processing unit 122 generates the second image from the second pixel mixture signals.

Likewise, the third image processing unit 123 converts the third pixel mixture signals, which are outputted from the pixel reconstruction unit 111, into third image signals for constructing the third image and sends the third image signals to the fourth image processing unit 124. That is, the third image processing unit 123 generates the third image from the third pixel mixture signals.

Moreover, the fourth image processing unit 124 generates the fourth image, which is a high resolution image for still image, from at least two images selected from among the first image, the second image, and the third image. For example, the fourth image processing unit 124 generates fourth image signals for constructing the fourth image, which is the high resolution image for still image, from the second image signals and the third image signals, and sends the fourth image signals to the second image compression unit 132. The second image compression unit 132 converts the fourth image signals into data such as JPEG data and stores the resultant data in the storage unit 141. That is, the fourth image processing unit 124 generates the fourth image, which is the high resolution image, from the second image and the third image.

Depending on an operation, the processing unit 110 uses the temporary storage unit 140 as a work memory area.

Figure 3:
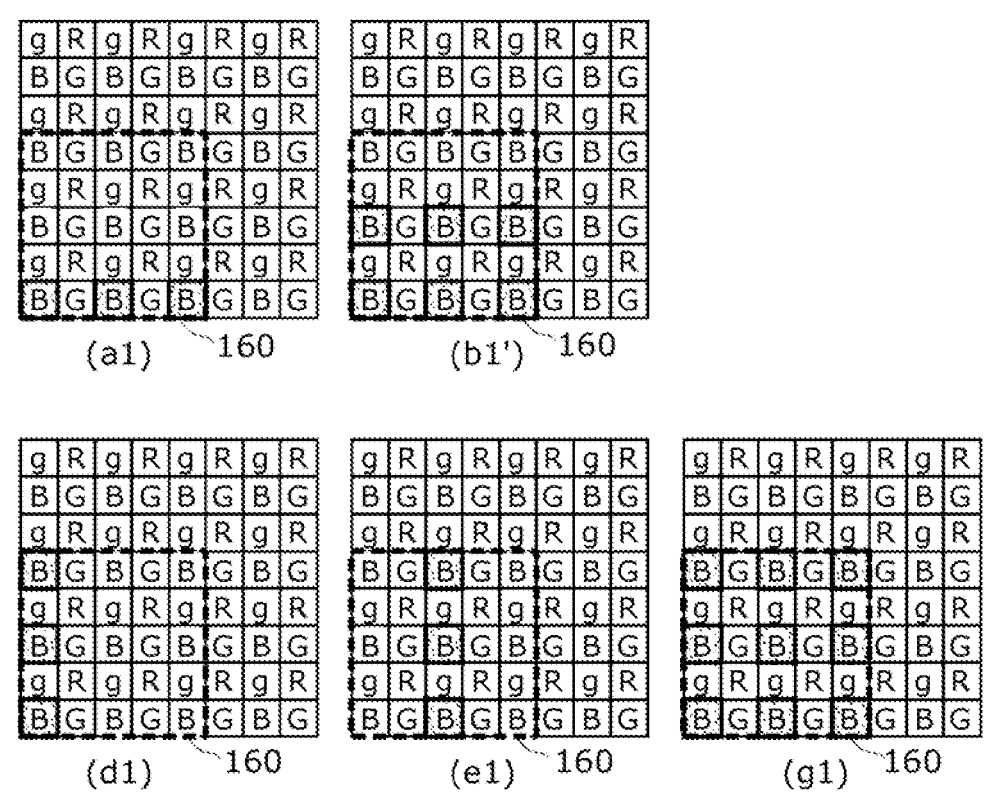

FIG. 3 shows arrays of mixed pixels of the pixel mixture signals outputted by the solid-state imaging device 103 according to the present embodiment. R, G, and B shown in the figure indicate pixels having color filters R, G, and B, respectively. Moreover, g indicates G on the column for R. Moreover, the figure shows the pixel mixture signals in the solid-state imaging device 103 in which the first region is formed of M×M pixels, the second region is formed of n×M pixels, and the third region is formed of M×n pixels, where M=3 and n=1. M denotes a positive integer represented by n×α, where n is an integer greater than or equal to 1 and α is an integer greater than or equal to 2. Moreover, here, α=3 is satisfied. That is, regions indicated by dotted lines in the figure are each a first region 160 which includes nine pixels having the color filter B, a region which includes three pixels having the same color B in the row direction in each first region 160 is the second region, and a region which includes three pixels having the same color B in the column direction in the first region 160 is the third region. Moreover, three of the second regions are disposed in the column direction in the first region 160 and three of the third regions are disposed in the row direction in the first region 160. In FIG. 3, the pixel mixture signals of pixels B are shown. However pixel mixture signals of pixels G, g, and R are disposed in the same manner.

As shown in FIG. 3, in the present embodiment, with respect to nine B pixels indicated by the dotted line in the first region 160, the solid-state imaging device 103 outputs the pixel mixture signals each obtained by mixing the pixel signals of the pixels in arrays of five types including the following number of pixels in the horizontal and vertical directions, (a1) 3×1 pixels, (b1') 3×2 pixels, (d1) 1×3 pixels, (e1) 1×3 pixels, and (g1) 3×3 pixels. Specifically, the solid-state imaging device 103 outputs: the second pixel mixture signal obtained by mixing the pixel signals of three pixels B in the second region shown in (a1); the fourth pixel mixture signal obtained by mixing the pixel signals of six pixels B in two of the second regions shown in (b1'); the third pixel mixture signals obtained by mixing the pixel signals of three pixels B in the third regions each shown in (d1) and (e1); and the first pixel mixture signal obtained by mixing the pixel signals of nine pixels B in the first region 160 shown in (g1).

Moreover, pixel mixture signals present in regions that are not outputted by the solid-state imaging device 103 are reconstructed from the pixel mixture signals of the aforementioned five types by the following conversions equations.

(a1)=(a1)

(b1)=(b1')−(a1)

(c1)=(g1)−(b1')

(d1)=(d1)

(e1)=(e1)

(f1)=(g1)−(d1)−(e1)

(g1)=(g1)

Figure 4:
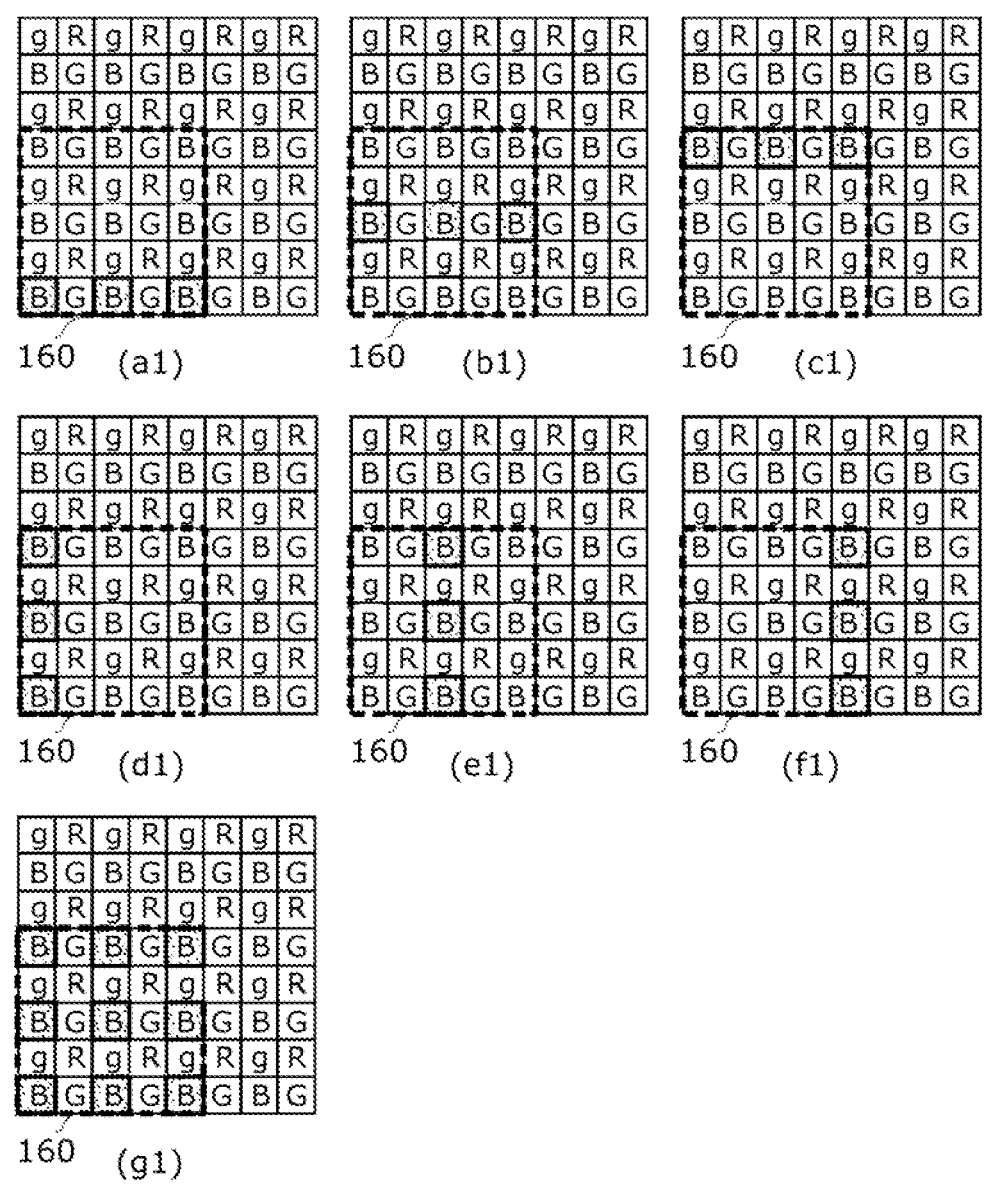

This allows pixel mixture signals of seven types (a1) to (g1) which are shown in FIG. 4 to be obtained.

In FIG. 4, (g1) shows the mixed pixels of the first region, (a1), (b1), and (c1) show the mixed pixels of the second regions, and (d1), (e1), and (f1) show the mixed pixels of the third regions. Alternatively, the solid-state imaging device 103 may output a fifth pixel mixture signal obtained by mixing the pixel signals in a plurality of the third regions in the manner as outputting the fourth pixel mixture signal that is obtained by mixing the pixel signals in two of the second regions in (b1').

Due to the array of 3×3 pixels (g1) shown in FIG. 4, a low resolution image (the first image) can be obtained in the same manner as in the conventional video mode. Here, since the first pixel mixture signal is an image signal generated using all pixel signals in the first region 160, the first pixel mixture signal allows an image having no distortion or alternation in color of the image in row and column directions to be obtained even if the image has low resolution.

Moreover, in (a1) to (c1) of FIG. 4, the second pixel mixture signals each obtained by mixing the pixel signals of three pixels disposed on the same row in the second region are generated. That is, in each second region, the second pixel mixture signal in which the pixel signals in the row direction are decimated is generated. Then, performing the image processing on the second pixel mixture signals shown in (a1) to (c1) generates an image (the second image) which has the same vertical resolution as an image that is obtained without performing the pixel mixing described above. The second image is obtained in the way of decimating the pixel signals in the row direction and thus is an image that has short sides in the row direction and long sides in the column direction.

Likewise, in (d1) to (f1) in FIG. 4, the third pixel mixture signal obtained by mixing the pixel signals of three pixels disposed on the same column in the third region is generated. That is, in each third region, the third pixel mixture signal in which the pixel signals in the column direction are decimated is generated. Then, performing the image processing on the third pixel mixture signals shown in (d1) to (f1) generates an image (the third image) which has the same horizontal resolution as an image that is obtained without performing the pixel mixing described above. The third image is obtained in the way of decimating the pixel signals in the column direction, and thus is an image that has short sides in the column direction and long sides in the row direction.

Furthermore, the first image, the second image, and the third image described above are generated from the pixel signals that are exposed at the same timing. Thus, synthesizing the second image and the third image concurrently with generating a low resolution image (the first image) for video image as in the same manner as with the conventional video mode generates the high resolution image (the fourth image) for still image which is similar to an image that is obtained without performing the pixel mixing.

Moreover, in addition to the case of the color B, the low resolution image and the high resolution image can be generated in the same manner with respect to the other colors R, G, and g.

Figures 5A, 5B:
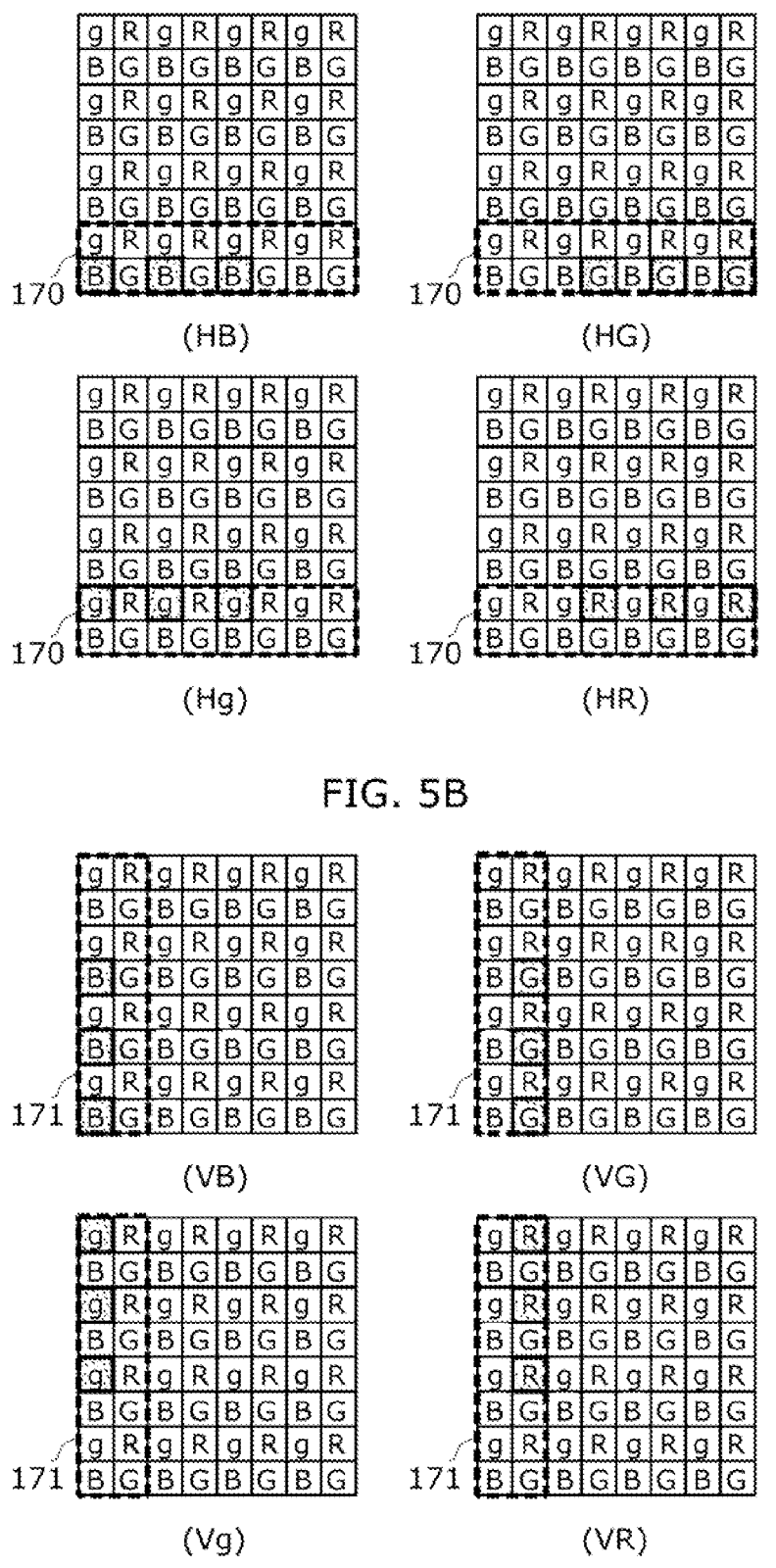

FIG. 5A and FIG. 5B are diagrams showing combinations of the pixel mixture signals for generating the second image and the third image, respectively. With respect to each R, g, G, and B, as shown in FIG. 5A, the second pixel mixture signals each formed of a combination of (HR), (Hg), (HG), or (HB) are generated in a region 170. The second pixel mixture signals are image processed to generate the second image which has a reduced horizontal resolution while maintaining the vertical resolution.

Moreover, similarly, with respect to each R, g, G, and B, as shown in FIG. 5B, the third pixel mixture signals each formed of a combination of (VR), (Vg), (VG), or (VB) are generated in a region 171. The third pixel mixture signals are image processed to generate the third image which has a reduced vertical resolution while maintaining the horizontal resolution.

Figure 6:
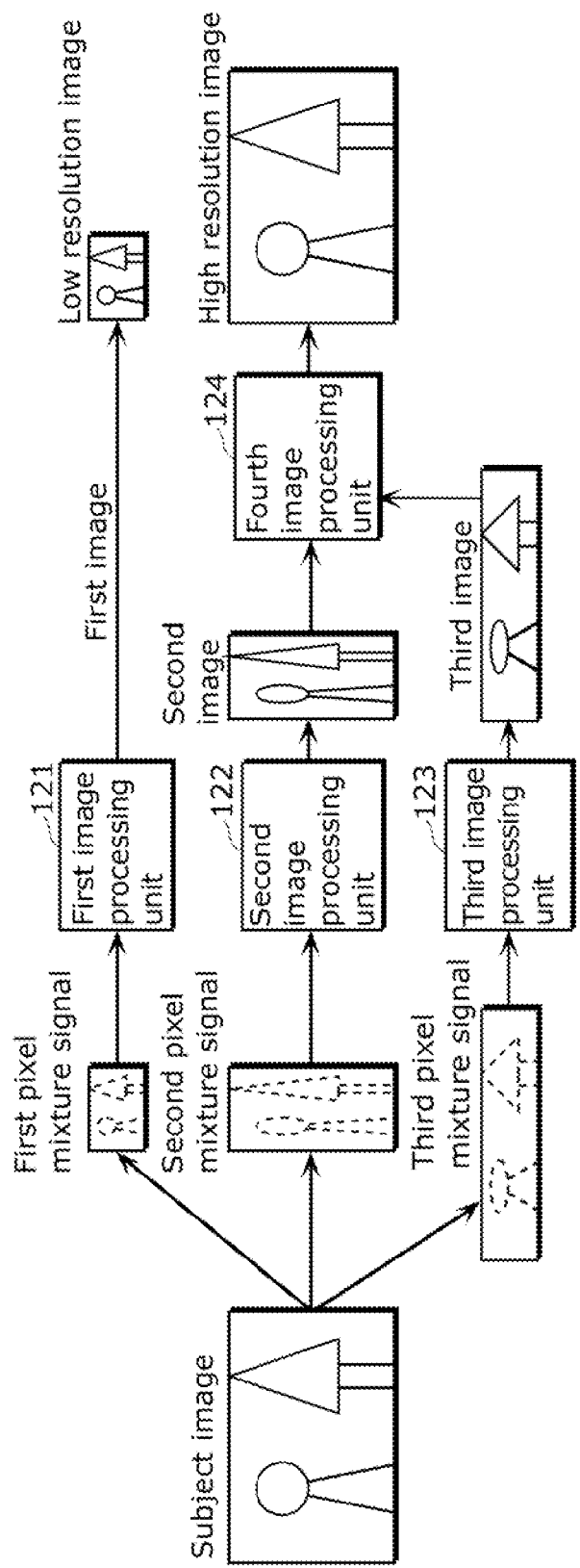
FIG. 6 is a diagram showing an operation of an image processing unit.

FIG. 6 shows an operational view of how the fourth image is generated from the second image and the third image. The first pixel mixture signals, second pixel mixture signals, and third pixel mixture signals are obtained from the solid-state imaging device 103 as described above with respect to a subject image. The first image processing unit 121 performs the image processing on the first pixel mixture signals to generate the first image having reduced vertical and horizontal resolutions. The second image processing unit 122 performs the image processing on the second pixel mixture signals to generate the second image having a reduced horizontal resolution while maintaining the vertical resolution. The third image processing unit 123 performs the image processing on the third pixel mixture signals to generate the third image having a reduced vertical resolution while maintaining the horizontal resolution.

Figure 7:
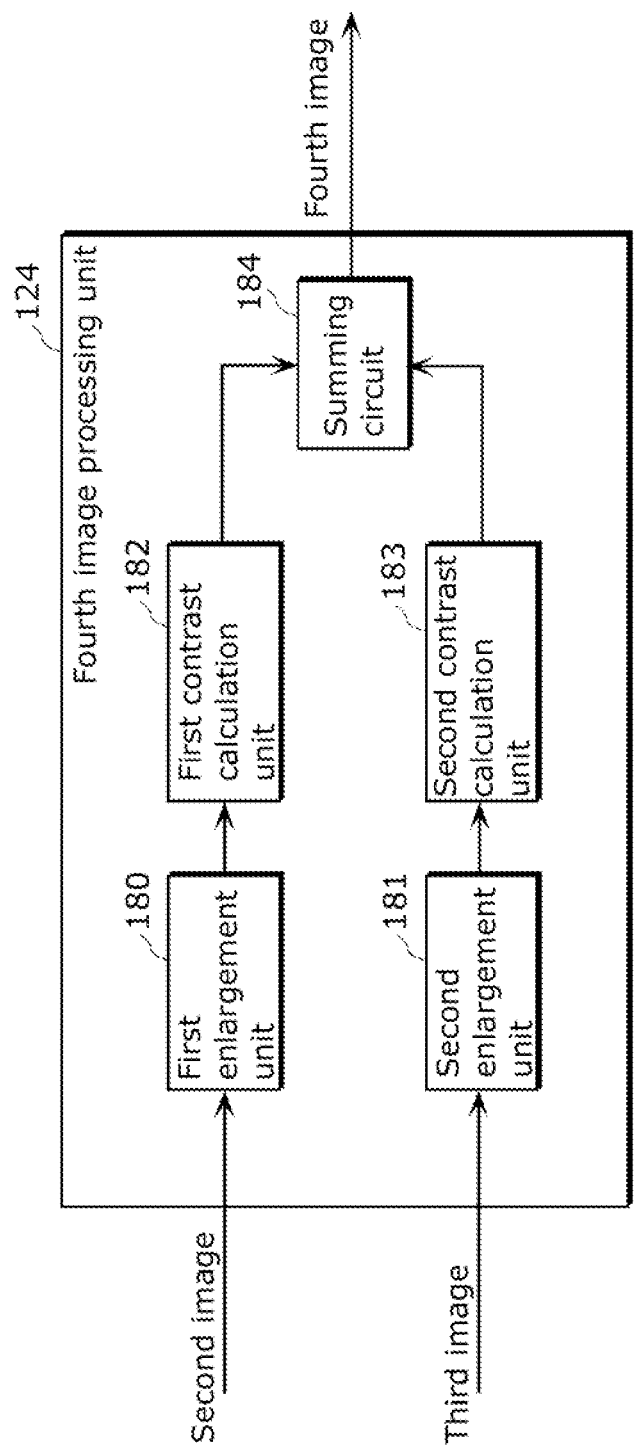
FIG. 7 is a block diagram of a fourth image processing unit.

Next, an operation of the fourth image processing unit 124 will be described with reference to FIG. 7. The fourth image processing unit 124 includes a first enlargement unit 180, a second enlargement unit 181, a first contrast calculation unit 182, a second contrast calculation unit 183, and a summing circuit 184.

The first enlargement unit 180 and the second enlargement unit 181 enlarge the second image and the third image, respectively, so that the sizes of the second image and the third image match each other. Specifically, the first enlargement unit 180 and the second enlargement unit 181 enlarge the second image and the third image that are inputted from the second image processing unit 122 and the third image processing unit 123 to generate a first enlarged image and a second enlarged image, respectively, that have the same number of pixels as the high resolution image, for example. This enlarges the second image and the third image to be the first enlarged image and the second enlarged image, respectively, that have the same size. The first enlarged image and the second enlarged image may be obtained so as to have a number of pixels of other image, irrespective of the number of pixels of the high resolution image, insofar as the first enlarged image and the second enlarged image are enlarged to the same size.

Sequentially, with respect to each pixel of the first enlarged image, the first contrast calculation unit 182 calculates first contrast of image signals of a pixel and the surrounding pixels. Moreover, similarly, with respect to each pixel of the second enlarged image, the second contrast calculation unit 183 calculates second contrast of image signals of a pixel and the surrounding pixels. Here, the contrast is a difference in signal level between a predetermined pixel and the surrounding pixels in the second image or an absolute value of the difference, and a difference in signal level between a predetermined pixel and the surrounding pixels in the third image or an absolute value of the difference. For example, in the case of pixels having the color filter B that are arranged in the first region 160 as shown in FIG. 3, a contrast value of each pixel is a difference in signal level between a pixel B and any of eight pixels B that are arranged surrounding the pixel or an absolute value of the difference. Alternatively, the contrast value may be a value obtained by averaging the difference in signal level between the pixel B and the eight pixels B or an absolute value of the difference.

The fourth image processing unit determines a signal level of a pixel at a predetermined position of the first enlarged image and a signal level of a pixel at a corresponding position of the second enlarged image with respect to all pixels in the first enlarged image and the second enlarged image, based on signal levels which are mixed, namely, weight averaged by a contrast ratio between the first contrast and the second contrast, to generate the fourth image.

For example, given that the signal level and the first contrast of the pixel at the predetermined position of the first enlarged image are represented by P2 and C2, respectively, the signal level and the second contrast of the pixel at a corresponding position of the second enlarged image are represented by P3 and C3, respectively, and the signal level of the fourth image is represented by Pnew, Pnew is determined by the following mathematical equation:

$$Pnew=T1[Ca,Cb] \times Pa+T2[Ca,Cb] \times Pb \quad (eq. 1),$$

where T1[Ca, Cb]+T2[Ca, Cb]=1, and T1 and T2 are constants that depend on Ca and Cb, respectively. Here, given that T1[Ca, Cb]=C2/(C2+C3) and T2[Ca, Cb]=C3/(C2+C3), the mathematical equation is indicated by the following mathematical equation:

$$Pnew=(C2/(C2+C3)) \times P2+(C3/(C2+C3)) \times P3 \quad (eq. 2).$$

T1[Ca, Cb] and T2[Ca, Cb] are not necessarily calculated in accordance with values of C2 and C3, respectively, and may be table data derived in accordance with the values of C2 and C3, respectively.

The fourth image may be generated by selecting, based on a contrast value of the first contrast of the first enlarged image and a contrast value of the second contrast of the second enlarged image, the image signal of the first enlarged image or the second enlarged image that has a larger contrast value, instead of using the mathematical equations (eq. 1) and (eq. 2).

Figure 8B:
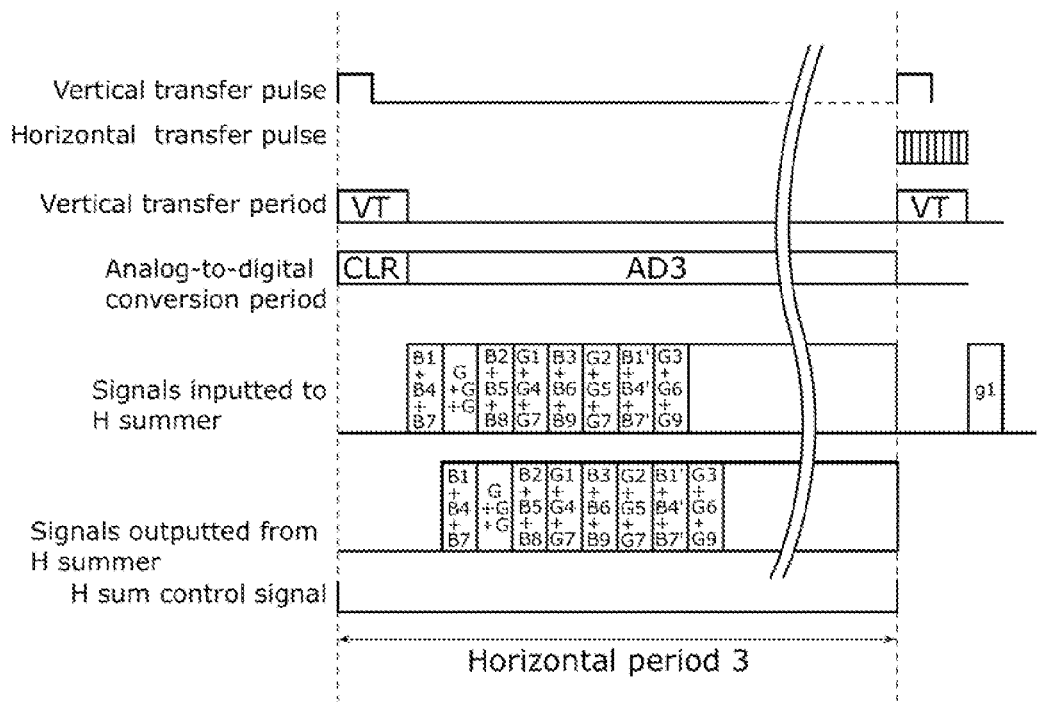
FIG. 8B is a timing diagram showing another example of the operation of outputting a pixel mixture signal.

An example of an operational timing of the solid-state imaging device 103 according to the present embodiment is shown in FIG. 8A. Moreover, a timing diagram will be described with reference to FIG. 8B in which pixel signals B1 to B9 shown in (A) Pixel mixture signal shown in FIG. 8A are mixed and the obtained pixel mixture signals are outputted from the solid-state imaging device 103.

First, in a horizontal period 3' shown in FIG. 8A, the analog-to-digital conversion is performed on the pixel signals on a row V0 by the analog-to-digital conversion circuit 155 in synchronization with the vertical transfer pulse (AD0 unit). After the completion of the analog-to-digital conversion performed on all pixels on the row V0, the line memory 157 is cleared (CLR unit), resultant data from the analog-to-digital conversion is transferred to the line memory 157, and the data is held therein (MEM unit).

Subsequently, in a horizontal period 1, the analog-to-digital conversion is performed on the pixel signals on a row V2 in synchronization with the vertical transfer pulse (AD2 unit). Here, the CLR operation is not performed, leaving the line memory 157 not cleared. Concurrently, the pixel signals on the row V0 in the line memory 157 are transferred horizontally to be inputted to the H summer 158. The H summer 158 sums every three pixels while outputting the resultant pixel signals to the solid-state imaging device 103. This operation outputs the pixel mixture signal of the pixels in (a1) shown in FIG. 3, namely, the second pixel mixture signal. After the completion of the analog-to-digital conversion and output of the all pixels on the row V2, resultant data from the analog-to-digital conversion performed on the pixel signals on the row V2 is added to the data held in the line memory 157 (MEM unit).

Subsequently, in a horizontal period 2, the analog-to-digital conversion is performed on the pixel signals on a row V4 in synchronization with the vertical transfer pulse (AD4 unit). Here, the CLR operation is not performed, leaving the line memory 157 not cleared. Concurrently, data of the pixel mixture signals on the row V0 and V2 in the line memory 157 is transferred horizontally to be inputted to the H summer 158. The H summer 158 sums every three pixels while outputting the resultant pixel signals to the solid-state imaging device 103. This operation outputs the pixel mixture signal of the pixels shown in (b1') shown in FIG. 3, namely, the fourth pixel mixture signal. After the completion of the analog-to-digital conversion and output of the all pixels on the row V4, resultant data from the analog-to-digital conversion performed on the pixel signals on the row V4 is added to the data held in the line memory 157 (MEM unit).

Subsequently, in a horizontal period 3, the analog-to-digital conversion is performed on the pixel signals on a row V3 in synchronization with the vertical transfer pulse (AD3 unit). Here, the CLR operation is not performed, leaving the line memory 157 not cleared. Concurrently, data of the pixel mixture signals on the row V0, V2, and V4 in the line memory 157 is transferred horizontally to be inputted to the H summer 158. Here, the H summer 158 outputs the pixel signals of two pixels without summing, and outputs, for every three pixels, a total of the pixel signals of three pixels. This operation outputs the pixel mixture signals shown in (d1), (e1), and (g1) of FIG. 3, namely, the third pixel mixture signals and the first pixel mixture signal. After the completion of the analog-to-digital conversion and output of the all pixels on the row V4, the line memory 157 is cleared (CLR unit) and a resultant data from the analog-to-digital conversion performed on the pixel signals on a row V6 is transferred to the line memory 157 (MEM unit). The operation in the horizontal period 3 is the same as the operation in the horizontal period 3'. Repeating the horizontal periods 1 to 3 allows the pixel signals of all colors R, G, g, and B to be acquired. Moreover, in capturing a plurality of time continuous images, repeating the above-described operations sequentially changes the position of each first region for each frame corresponding to each image. Thus, the image signals of the plurality of images can be acquired by the above-described method.

In the case of outputting the first pixel mixture signal from the solid-state imaging device 103, the second pixel mixture signals may be outputted in the horizontal period 3 at an operation timing as shown in FIG. 8B. That is, the first pixel mixture signal may be outputted in the horizontal period 3 by mixing the pixel signals B1 to B9 in (A) Pixel mixture signal shown in FIG. 8A after the period for the AD3 unit and the line memory 157 is cleared (CLR unit).

Moreover, in the horizontal period 3, a pixel mixture signal which is obtained by summing the pixel signals of pixels shown in (d1) and (e1) of FIG. 3, namely, the fifth pixel mixture signal may be outputted.

Referring back to FIG. 3 and FIG. 4, features of the pixel mixing mode according to the present mode will be described. As shown in FIG. 3, five of the pixel mixture signals are outputted from the solid-state imaging device 103. The pixel mixture signals are reconstructed into seven pixel mixture signals shown in FIG. 4, thereby allowing the concurrent acquisition of the low resolution video images and the high resolution still images. At the same time, the number of pixel signals of nine pixels for the high resolution image can be compressed and reduced to of five pixels. Thus, the size of a temporary storage area required for the image processing can substantially be reduced to 5/9-fold. Moreover, since the processing unit 110 allows the high resolution image to be obtained using five pixel signals (a1) to (f1) shown in FIG. 3, the throughput of the image processing performed on a still image can be reduced to 5/9-fold.

This allows concurrent output of high resolution video images and high resolution still images without increasing the drive frequency of the image capture apparatus even if the number of pixels to be read out is reduced. Moreover, decreased power consumption and miniaturization of both the solid-state imaging device 103 and the processing unit 110, and high speed acquisition of still images are possible.

Here, the pixel mixing mode is configured using the analog-to-digital conversion circuit 155, the V summer 156, and the line memory 157. However, the configuration of the pixel mixing mode is not limited thereto. For example, a counter-based analog-to-digital converter achieves the same configuration. Features of the present mode are that the pixel mixing in the vertical and horizontal directions can be outputted in a reconfigurable format by outputting the pixel mixing in the vertical direction and the pixel mixing in the horizontal direction in a specific mode in the solid-state imaging device using a column A-D scheme, and such features can be achieved independent of the analog-to-digital conversion scheme or the configuration of the line memory.

As described above, the features of the solid-state imaging device according to the present embodiment are that the first region formed of M×M pixels is arranged such that the plurality of second regions each formed of n×M pixels and the plurality of third regions each formed of M×n pixels overlap with one another, and furthermore, a part of the first pixel mixture signal, a part of the second pixel mixture signal, and a part of the third pixel mixture signal are shared therebetween, and the first pixel mixture signal, the second pixel mixture signal, and the third pixel mixture signal are outputted. Therefore, generation of the high resolution image by reading out a reduced number of pixel signals is possible. Here, M is an integer satisfying M>2 and n is a divisor of M, inclusive of 1. The fourth pixel mixture signal and the fifth pixel mixture signal may further be generated and outputted together with the first pixel mixture signal, the second pixel mixture signal, and the third pixel mixture signal.

Moreover, the present embodiment is described assuming the solid-state imaging device configured with what is called the Bayer array that has three color filters R, G, and B. However, any array and any color can be used for a color solid-state imaging device. Moreover, the solid-state imaging device may be a monochrome solid-state imaging device. Alternatively, the solid-state imaging device may mix pixel signals having different colors.

(Embodiment 2)

An embodiment 2 is different from the embodiment 1 in that in a solid-state imaging device according to the embodiment 2 having a first region formed of M×M pixels, a second region formed of n×M pixels, and a third region formed of M×n pixels, M=2 ($\alpha$=1) and n=1 are satisfied. That is, the pixel signals of four pixels in the first region are mixed.

Figure 9:
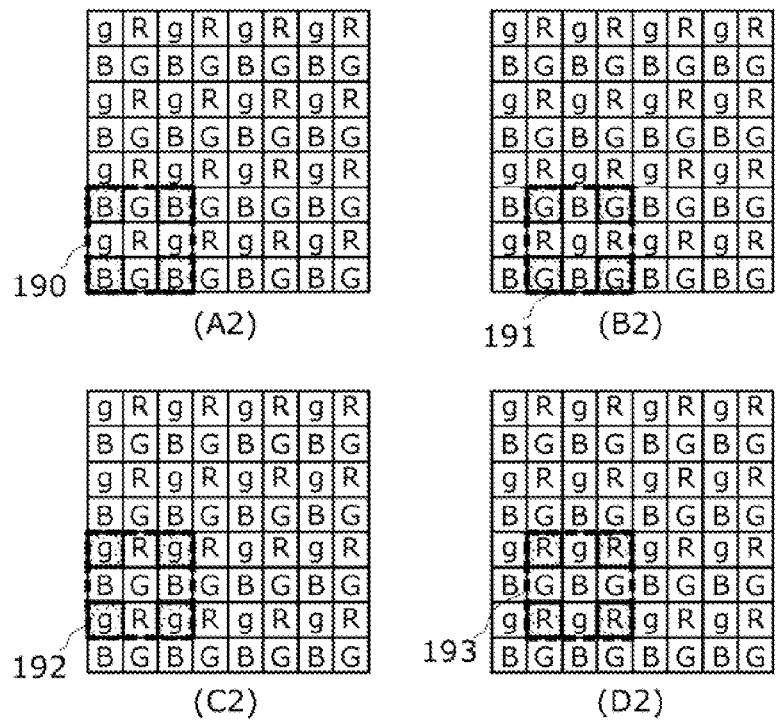
FIG. 9 is a diagram showing a combination of pixel mixture signals according to an embodiment 2 of the present invention.
Figure 10:
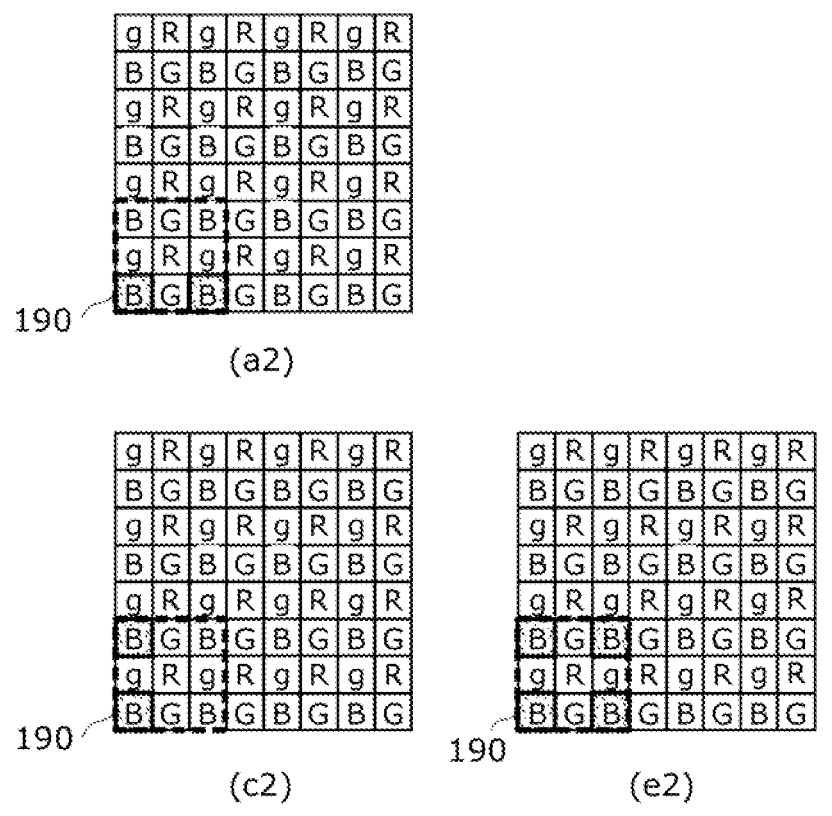
Figure 11:
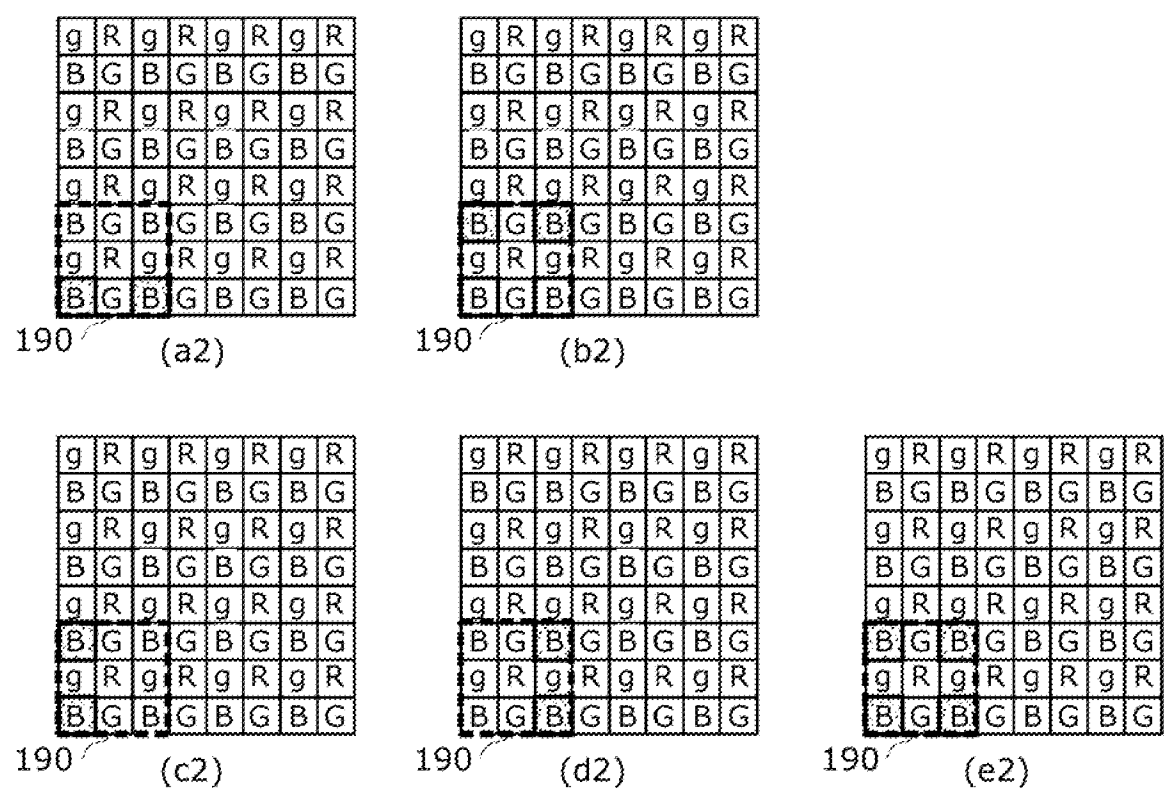

FIG. 9 is a diagram showing a combination of R, G, g, and B in the case of 4-pixel mixing, and (A2), (B2), (C2), and (D2) show first regions 190, 191, 192, and 193 for B, G, g, and R, respectively. FIG. 10 is a diagram showing arrays of mixed pixels of pixel mixture signals outputted by a solid-state imaging device 103, and (e2) shows a first pixel mixture signal, (a2) shows a second pixel mixture signal, and (c2) shows a third pixel mixture signal. Moreover, FIG. 11 is a diagram showing the arrays of mixed pixels of pixel mixture signals obtained from the solid-state imaging device 103, and (e2) shows the first pixel mixture signal, (a2) and (b2) show the second pixel mixture signals, and (c2) and (d2) show the third pixel mixture signals. According to the present embodiment, reconstruction from the pixel mixture signals of three types shown in FIG. 10 allows concurrent acquisition of the pixel mixture signals of five types shown in FIG. 11. Moreover, similarly, reconstruction from the pixel mixture signals of three types for each color G, g, and R allows concurrent acquisition of the pixel mixture signals of five types.

This allows a high resolution image having a resolution that is similar to the one obtained when all pixels are read out to be obtained. Moreover, in the case of reading out all pixels, the number of pixel signals of four pixels outputted from the solid-state imaging device 103 for the high resolution image can be compressed and reduced to of three pixels. Thus, the capacity of a temporary storage unit 140 required for the image processing and the throughput of the image processing performed on a still image can be reduced to 3/4-fold. This therefore allows concurrent output of high resolution video images and high resolution still images without increasing the drive frequency of the image capture apparatus even if the number of pixels to be read out is reduced.

(Embodiment 3)

An embodiment 3 is different from the embodiment 2 in that in a solid-state imaging device according to the embodiment 3 having a first region formed of M×M pixels, a second region formed of n×M pixels, and a third region formed of M×n pixels, M=6 ($\alpha$=3) and n=2 are satisfied. That is, the pixel signals of 36 pixels are mixed.

Figure 12:
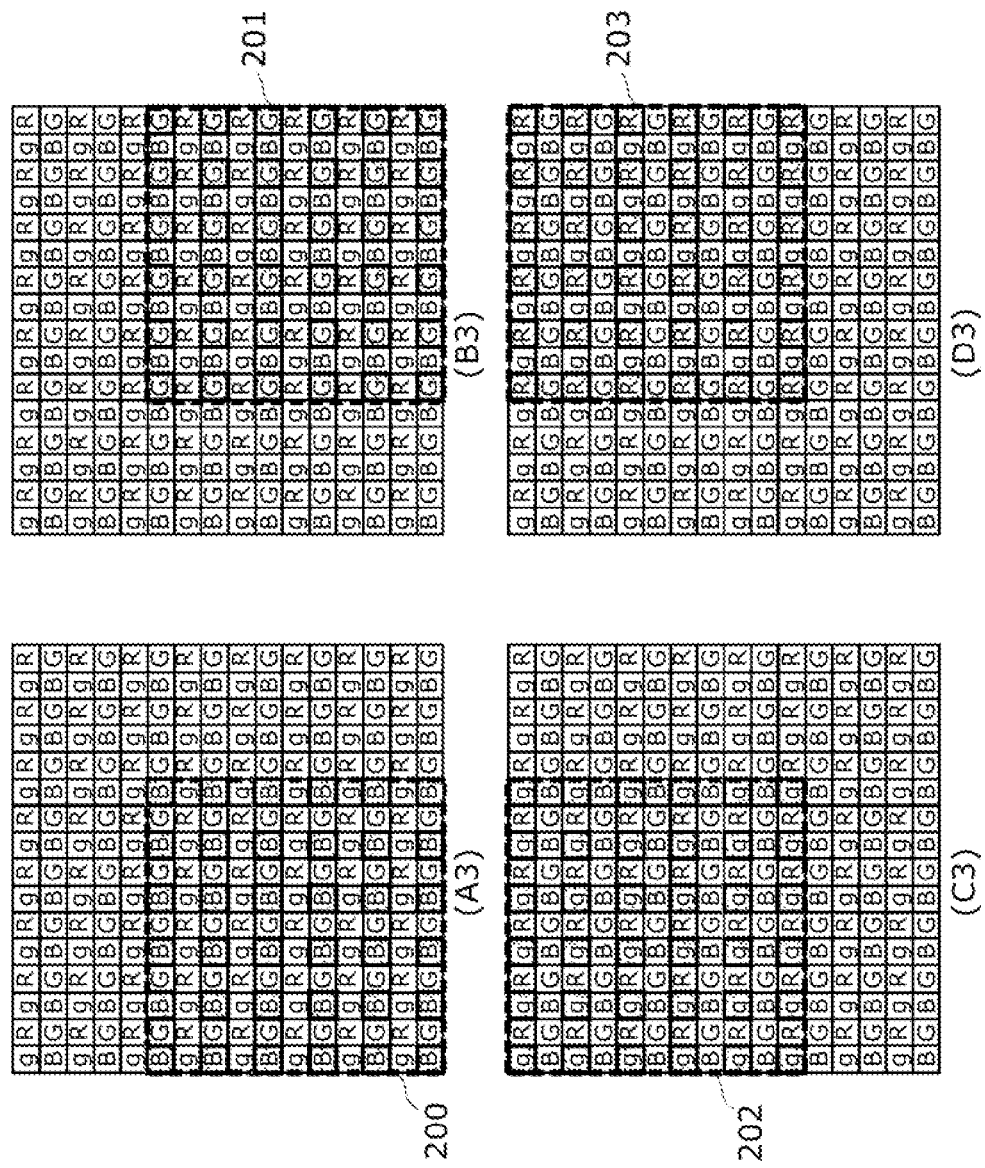
FIG. 12 is a diagram showing a combination of pixel mixture signals according to an embodiment 3 of the present invention.
Figure 13:
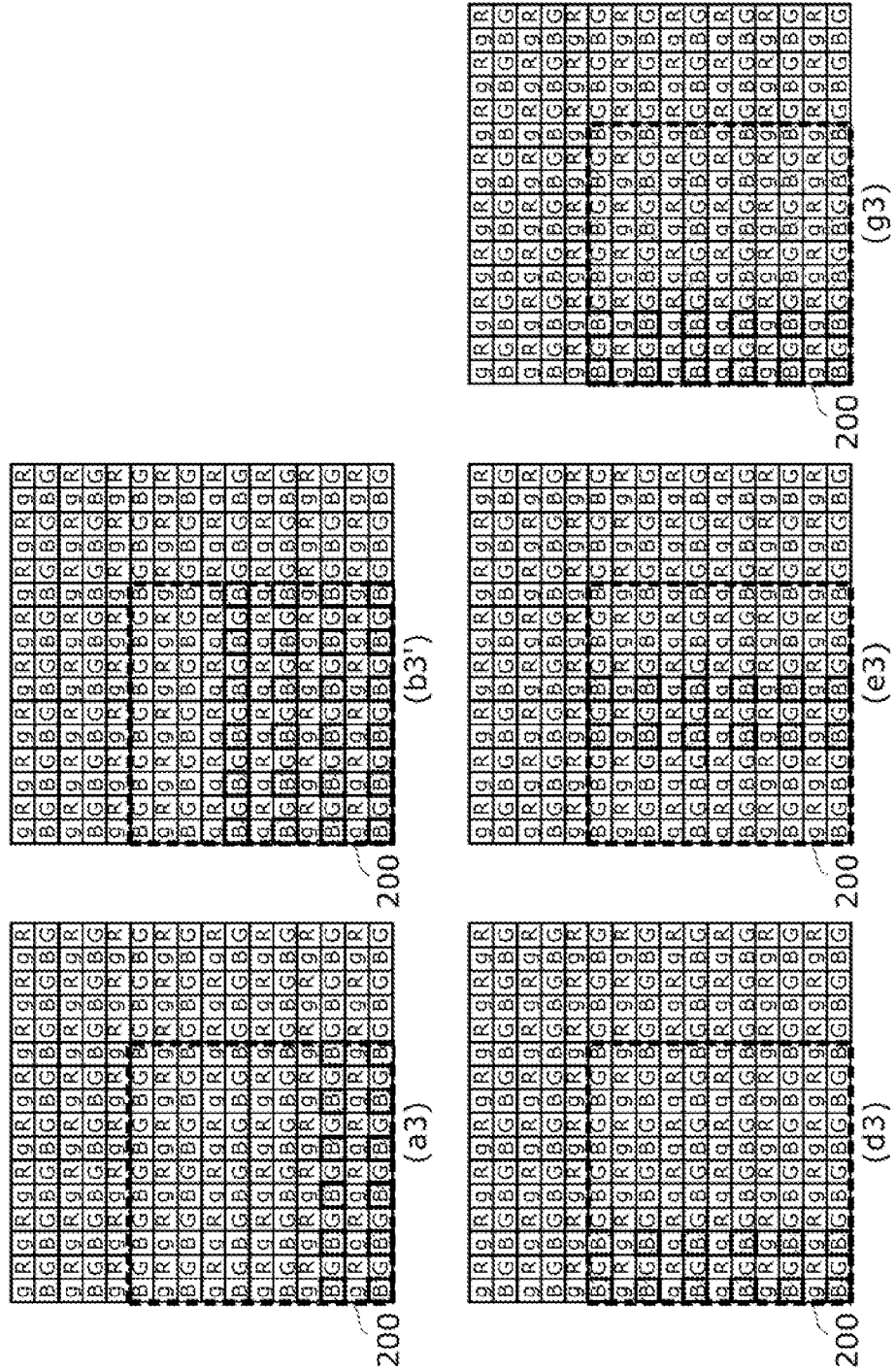
FIG. 13 is a diagram showing arrays of mixed pixels of pixel mixture signals outputted by the solid-state imaging device.

FIG. 12 is a diagram showing a combination of R, G, g, and B in the case of 36-pixel mixing, and (A3), (B3), (C3), and (D3) show first regions 200, 201, 202, and 203 for B, G, g, and R, respectively. FIG. 13 is a diagram showing arrays of mixed pixels of pixel mixture signals outputted by a solid-state imaging device 103, and (g3) shows a first pixel mixture signal, (a3) shows a second pixel mixture signal, (b'3) shows a fourth pixel mixture signal, and (d3) and (e3) show third pixel mixture signals. Moreover, FIG. 14 is a diagram showing the arrays of mixed pixels of pixel mixture signals obtained from the solid-state imaging device 103, and (g3) shows the first pixel mixture signal, (a3), (b3) and (c3) show the second pixel mixture signals, and (d3), (e3), and (f3) show the third pixel mixture signals.

Figure 14:
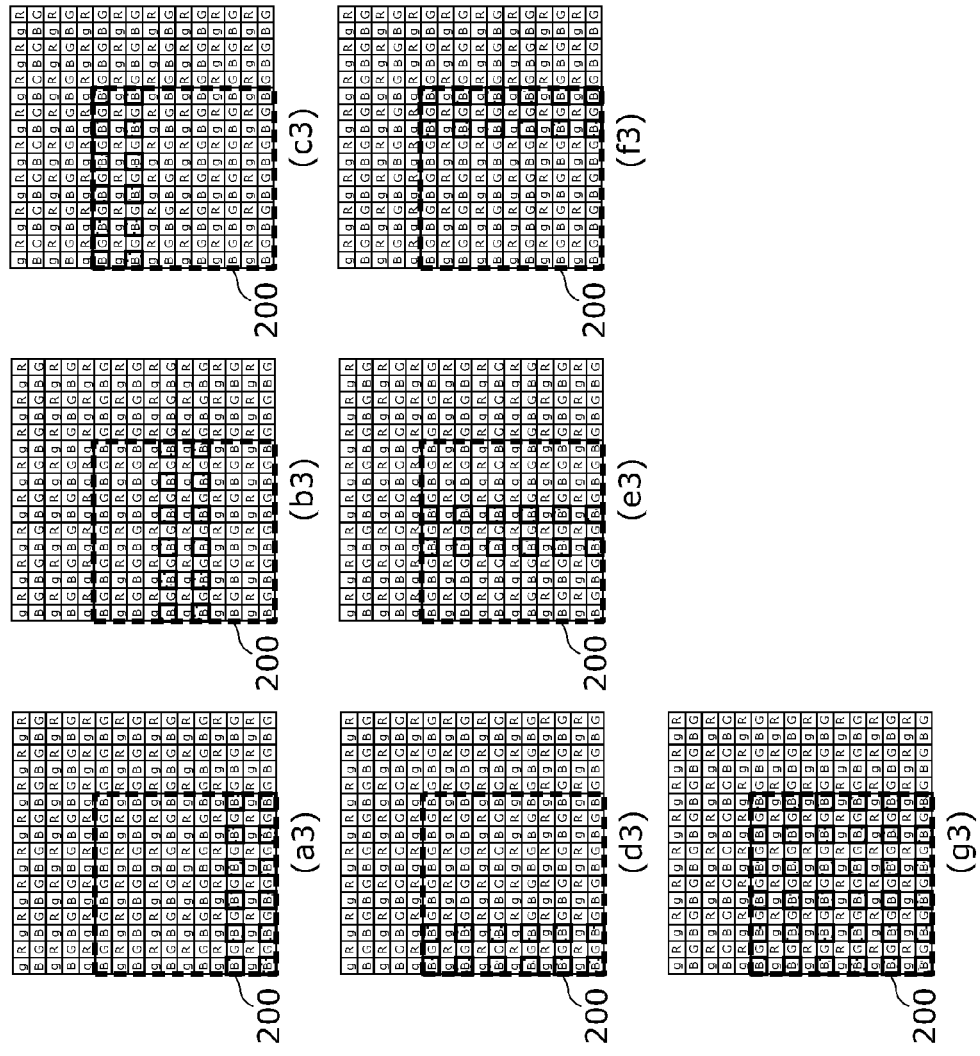
FIG. 14 is a diagram showing the arrays of mixed pixels of pixel mixture signals obtained from the solid-state imaging device.

According to the present embodiment, reconstruction from the pixel mixture signals of five types shown in FIG. 13 allows concurrent acquisition of the pixel mixture signals of seven types shown in FIG. 14. Moreover, similarly, reconstruction from the pixel mixture signals of five types for each color G, g, and R allows concurrent acquisition of the pixel mixture signals of seven types. Furthermore, the pixel signals of pixels on two rows are mixed in one second region and the pixel signals of pixels on two columns are mixed in one third region.

This allows a high resolution image having resolution that is similar to the one obtained when all pixels are read out to be obtained. Moreover, in the case of reading out all pixels, the number of pixel signals of 36 pixels outputted from the solid-state imaging device 103 for the high resolution image can be compressed and reduced to of five pixels. Thus, the capacity of a temporary storage unit 140 required for the image processing and the throughput of the image processing performed on a still image can be reduced to 5/36-fold. This therefore allows concurrent output of high resolution video images and high resolution still images without increasing the drive frequency of the image capture apparatus even if the number of pixels to be read out is reduced.

Figure 15:
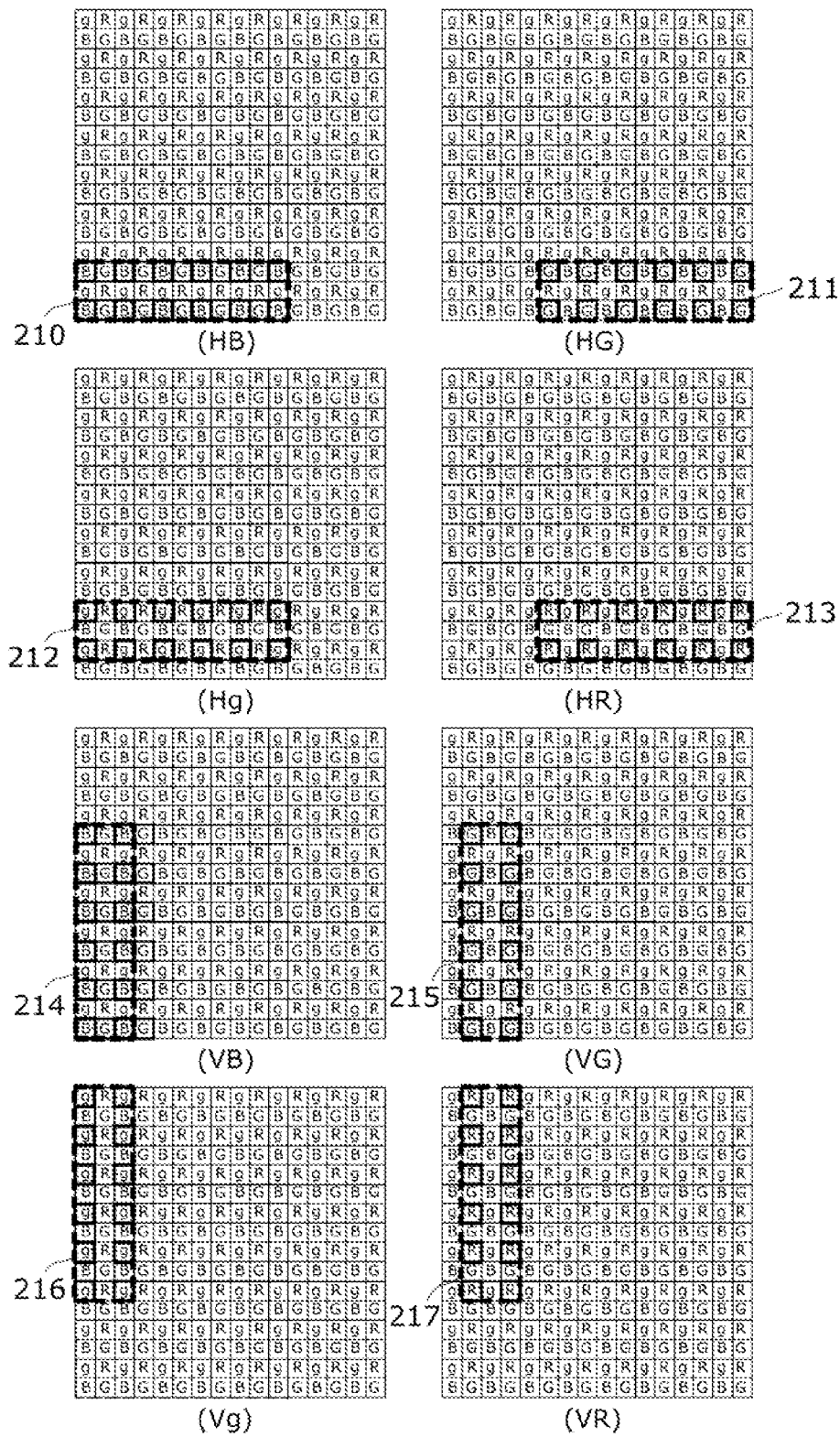
FIG. 15 is a diagram showing combinations of pixel mixture signals for generating the second image and the third image.

Similarly to FIG. 5A and FIG. 5B, FIG. 15 shows arrays of mixed pixels having respective colors for use in generating the second image and the third image, and shows, for B, G, g, and R, second regions 210, 211, 212, and 213, and third regions 214, 215, 216, and 217, respectively.

Furthermore, the present embodiment has the following advantages.

For example, in general, the video images have the sizes including two types which are SDTV (720×480 pixels) and HDTV (1,920×1,080 pixels). The video images are sized to images of TV receivers. However, the image sizes are not sufficient for the quality of still images, and thus the solid-state imaging device providing high resolution such as 140 megapixels (5,000×2,800 pixels) is increasingly used in the digital still cameras. Conventionally, in the video mode in the digital still camera, video images are generated by the 4-pixel mixing or the 9-pixel mixing. However, if the 4-pixel mixing is performed on an image having 120 megapixels, an image having 2,500×1,400 pixels is generated. The size of the generated image is larger than the size of HDTV, ending up requiring a reduction process. Thus, the image processing performed on the image having 2,500×1,400 pixels is wasted. Moreover, the 9-pixel mixing on the image results in an image having about 1,650×930 pixels which has a size less than the size of the HDTV, ending up requiring an enlargement process. Therefore, the image quality is undesirably deteriorated.

However, the mode performed by the present embodiment provides an image that has the size of 2,500×1,400 pixels while the throughput of the image processing may be as much as 5/36-fold. This allows allocation of optimal throughput of the image processing, in accordance with an image size required, and thus contributes to the decreased power consumption and the miniaturization of the image capture apparatus.

(Embodiment 4)

An embodiment 4 is different from the embodiment 1 in that an image capture apparatus according to the present embodiment includes a first image compression unit, a second image compression unit, and a third image compression unit.

Figure 16:
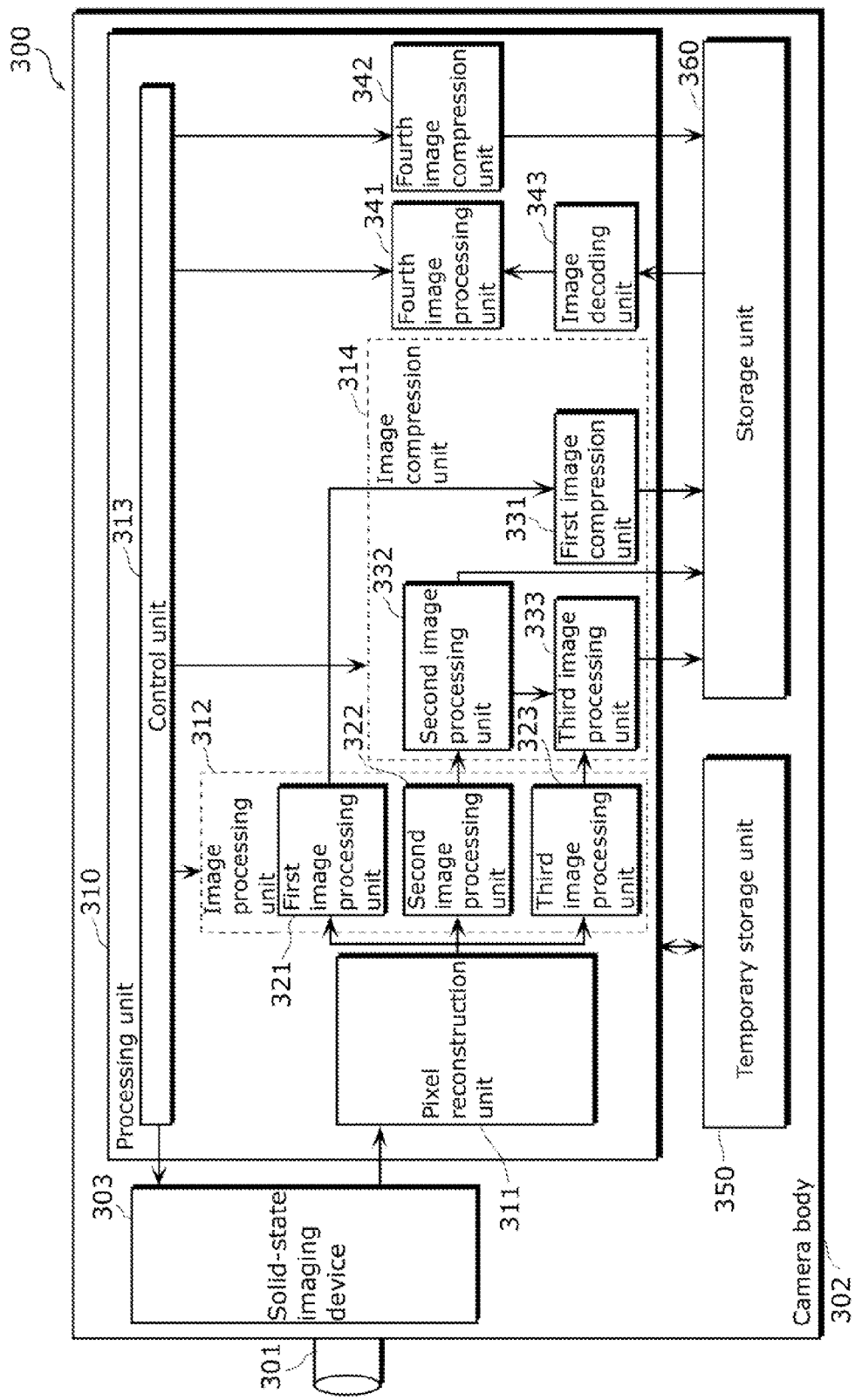
FIG. 16 is a block diagram of an image capture apparatus according to an embodiment 4 of the present invention.

FIG. 16 is a block diagram of an image capture apparatus 300 according to the present embodiment.

As shown in FIG. 16, the image capture apparatus 300 is, as similar to the embodiment 1, an image capture apparatus which includes an imaging lens 301 and a camera body 302. Moreover, the camera body 302 includes the solid-state imaging device 303, a processing unit 310, a temporary storage unit 350, and a storage unit 360. A subject image imaged by the imaging lens 301 is converted by the solid-state imaging device 303 into pixel signals and sent to the processing unit 310.

The processing unit 310 includes a pixel reconstruction unit 311, an image processing unit 312, a control unit 313, an image compression unit 314, a fourth image processing unit 341, a fourth image compression unit 342, and an image decoding unit 343.

The control unit 313 controls operations of the solid-state imaging device 303, the image processing unit 312, the image compression unit 314, the fourth image processing unit 341, and the fourth image compression unit 342.

Moreover, the temporary storage unit 350 is a work memory and used for temporarily storing therein the image signals in generating an image by the processing unit 310. Moreover, the storage unit 360 stores therein the image generated by the processing unit 310.

The image processing unit 312 includes a first image processing unit 321, a second image processing unit 322, and a third image processing unit 323. The image compression unit 314 includes a first image compression unit 331, a second image compression unit 332, and a third image compression unit 333. Similarly to the embodiment 1, a first pixel mixture signal, a second pixel mixture signal, and a third pixel mixture signal which are outputted from the pixel reconstruction unit 311 are converted into a first image signal, a second image signal, and a third image signal by the first image processing unit 321, the second image processing unit 322, and the third image processing unit 323, respectively, undergo compression transform by the first image compression unit 331, the second image compression unit 332, and the third image compression unit 333, respectively, of the image compression unit 314 into JPEG data, MPEG data, MPEG4 data or the like, and the resultant data is stored in the storage unit 360.

Here, the present embodiment is different from the embodiment 1 in that the image compression unit 314 separately performs compression encoding processes on the first image signal, the second image signal, and the third image signal, which are generated by the first image processing unit 321, the second image processing unit 322, and the third image processing unit 323, using the first image compression unit 331, the second image compression unit 332, and the third image compression unit 333, respectively, and stores the first image, the second image, the third image in the storage unit 360.

This eliminates the generation of the fourth image which is generated in the embodiment 1. In addition, a total image size combining sizes of the second image and the third image is smaller than the size of the fourth image which is generated in the embodiment 1. Thus, an image can be stored in the storage unit 360 using a reduced recording density.

Furthermore, the image capture apparatus 300 may include the image decoding unit 343, the fourth image processing unit 341, and the fourth image compression unit 342, and may decode the stored second image and third image by the image decoding unit 343 and further generate, arbitrarily, the fourth image using the fourth image processing unit 341 and the fourth image compression unit 342.

(Embodiment 5)

Figure 17:
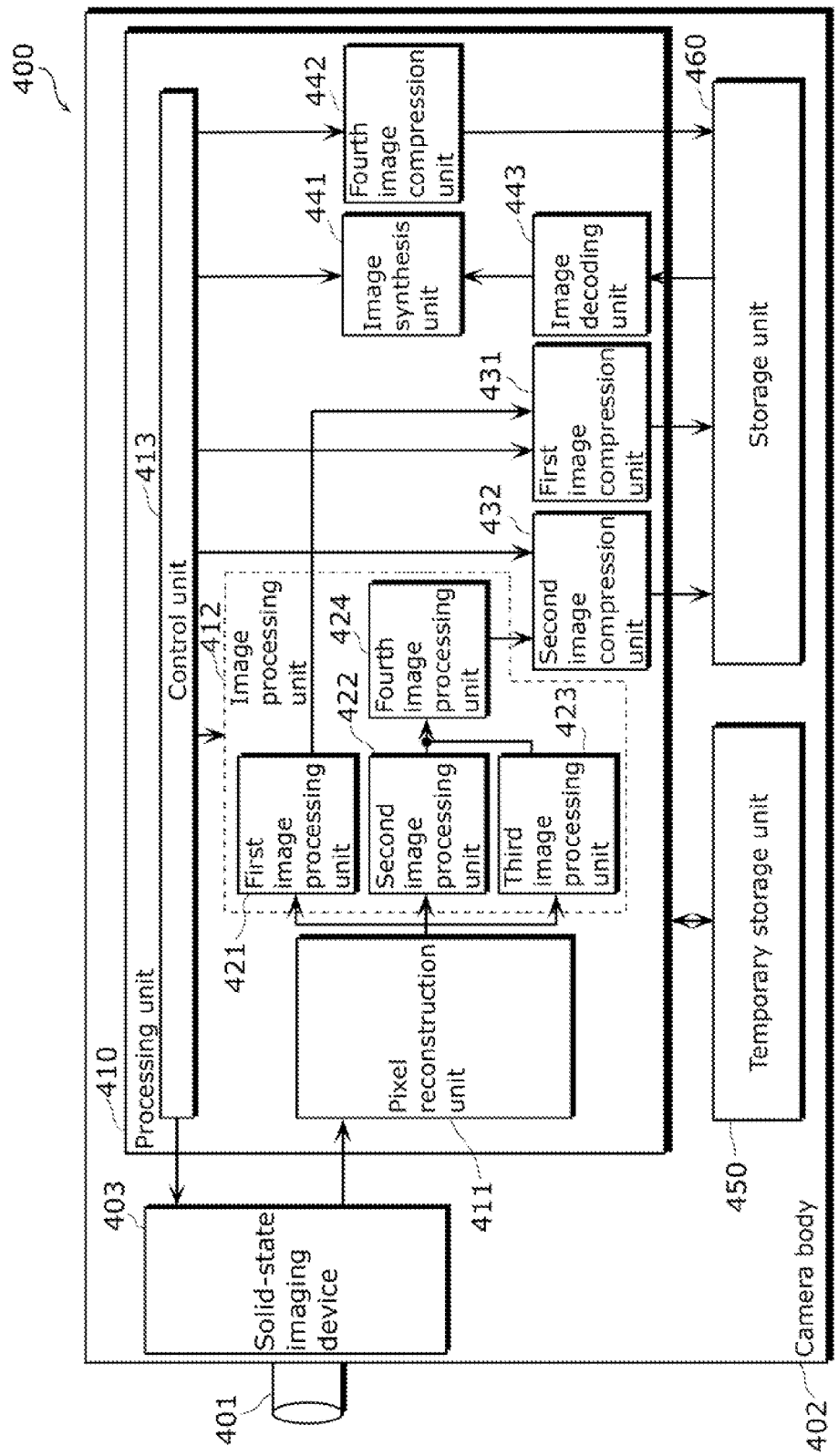
FIG. 17 is a block diagram of an image capture apparatus according to an embodiment 5 of the present invention.

An embodiment 5 is different from the embodiment 1 in that an image capture apparatus according to the present embodiment includes, in addition to the configuration of the image capture apparatus 100 according to the embodiment 1, an image synthesis unit, a fourth image compression unit, and an image decoding unit in a processing unit. FIG. 17 is a block diagram of an image capture apparatus 400 according to the present embodiment.

As shown in FIG. 17, the image capture apparatus 400 is, as similar to the embodiment 1, an image capture apparatus which includes an imaging lens 401 and a camera body 402. Moreover, the camera body 402 includes a solid-state imaging device 403, a processing unit 410, a temporary storage unit 450, and a storage unit 460. A subject image imaged by the imaging lens 401 is converted into pixel signals by the solid-state imaging device 403 and the pixel signals are sent to the processing unit 410.

The processing unit 410 includes a pixel reconstruction unit 411, an image processing unit 412, a control unit 413, a first image compression unit 431, a second image compression unit 432, an image synthesis unit 441, a fourth image compression unit 442, and an image decoding unit 443.

The control unit 413 controls operations of the solid-state imaging device 403, the image processing unit 412, the first image compression unit 431, the second image compression unit 432, the image synthesis unit 441, the fourth image compression unit 442, and the image decoding unit 443.

Moreover, the temporary storage unit 450 is a work memory and used for temporarily storing therein the image signals in generating an image by the processing unit 410. Moreover, the storage unit 460 stores therein the image generated by the processing unit 410.

The image processing unit 412 includes a first image processing unit 421, a second image processing unit 422, a third image processing unit 423, and a fourth image processing unit 424. Similarly to the embodiment 1, a first pixel mixture signal, a second pixel mixture signal, and a third pixel mixture signal which are outputted from the pixel reconstruction unit 311 are converted into a first image signal, a second image signal, and a third image signal by the first image processing unit 321, the second image processing unit 322, and the third image processing unit 323, respectively. The second image signal and the third image signal are further converted into a fourth image signal by the fourth image processing unit 424. Then, the first image signal and the fourth image signal are compression transformed into JPEG data, MPEG data, MPEG4 data, or the like by the first image compression unit 431 and the second image compression unit 432, respectively, and the resultant data is stored in the storage unit 460.

Moreover, the image synthesis unit 441 generates a fifth image having a higher definition from a plurality of the fourth images which are generated at different times. That is, the image decoding unit 443 decodes the plurality of fourth images stored in the storage unit 460, the image synthesis unit 441 generates fifth image signals from fourth image signals corresponding to the decoded fourth images, and the generated fifth image signals are stored in the storage unit 460.

FIG. 18A shows an example of sequence of operations for generating the fifth image signals. As shown in FIG. 18A, high resolution images (the fourth image) 470 corresponding to three frames that are continuously recorded undergo a synthetic process in time axis alignment at the same time when outputted from the image synthesis unit 441 via the image decoding unit 443 to generate one frame of a super high resolution image (the fifth image) 471.

Figure 18B:
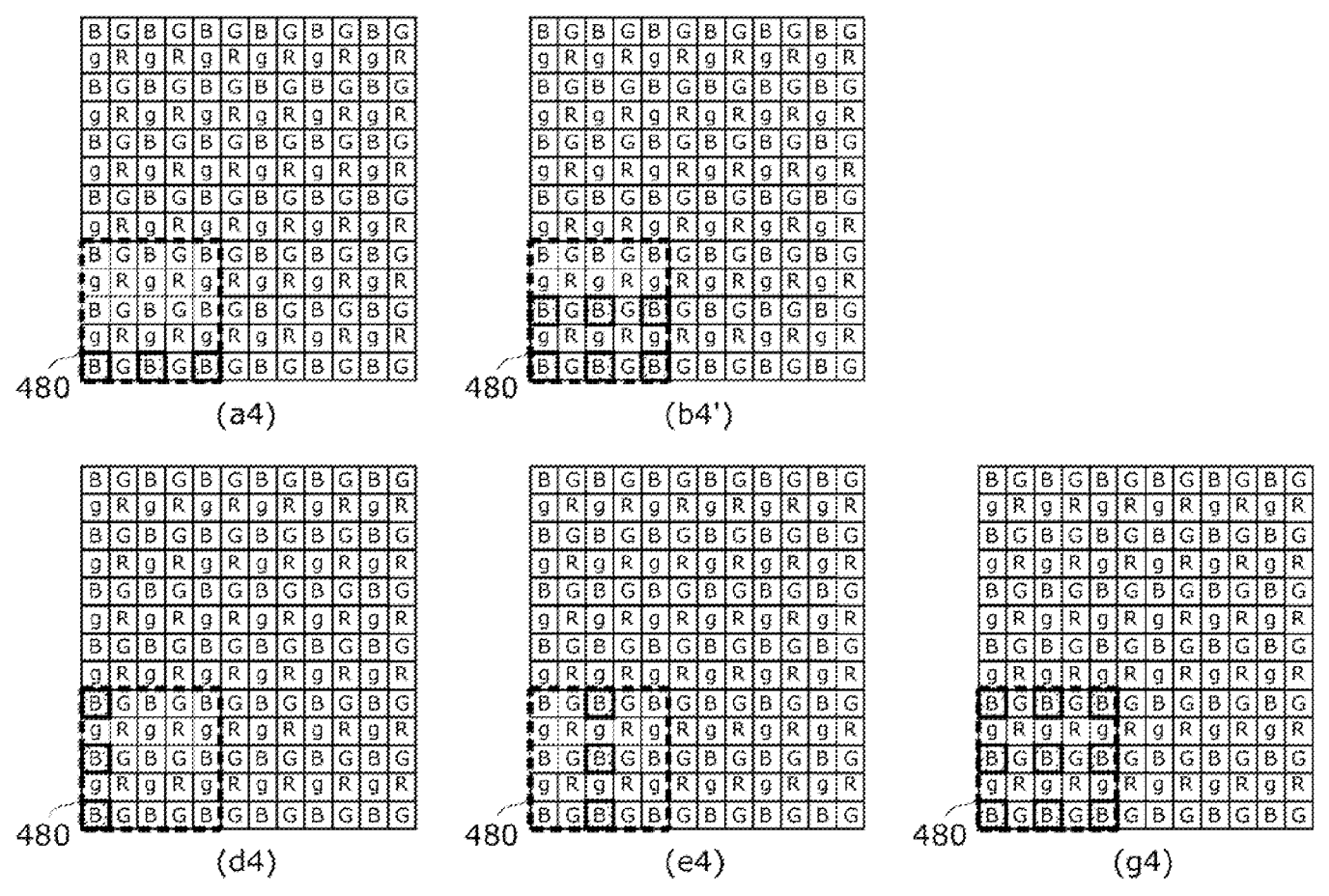
Figure 18D:
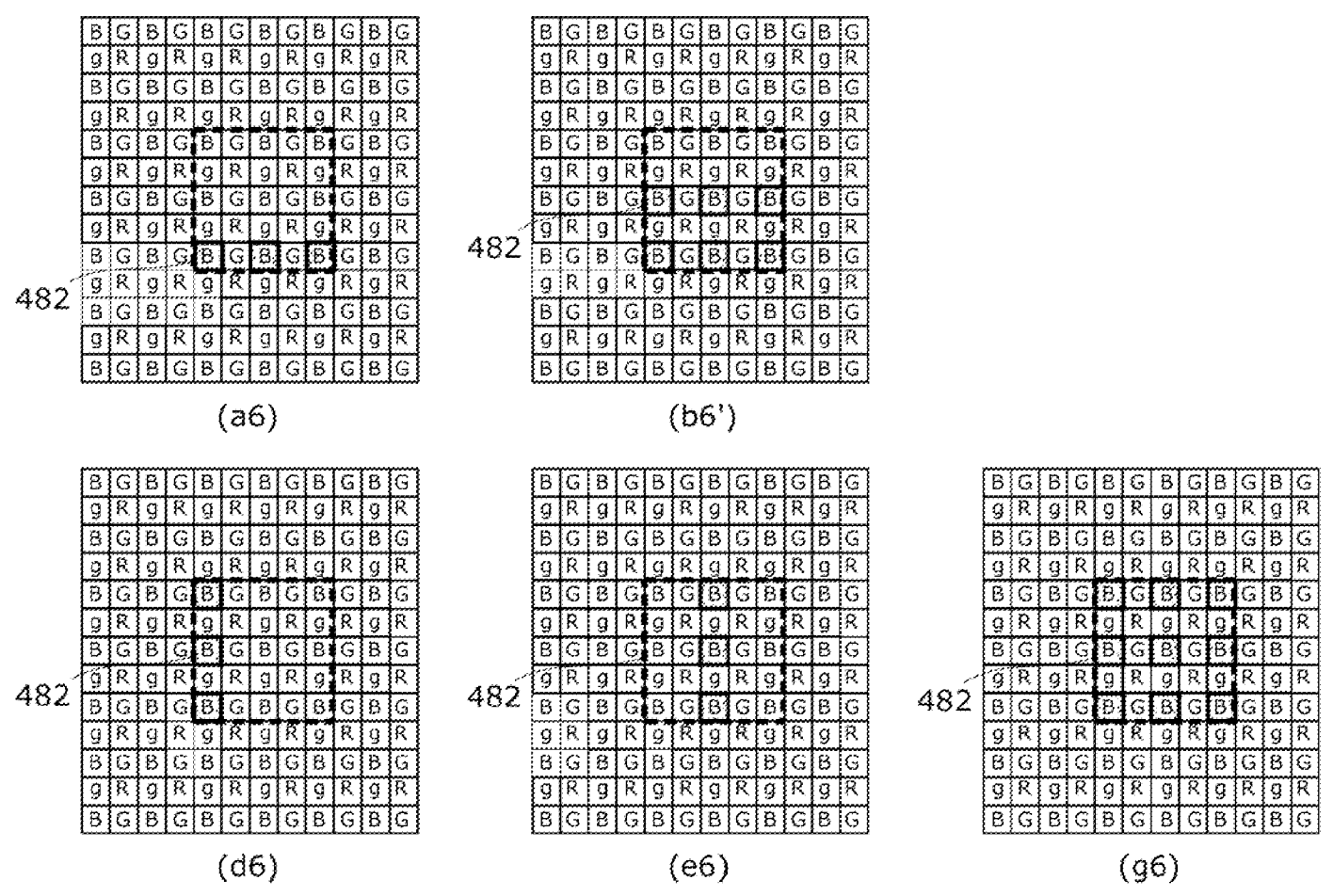

Moreover, FIGS. 18B to 18D are diagrams showing first regions 480, 481, and 482 in the fourth images corresponding to three frames. Generation of the super high resolution image is possible by sequentially shifting, for each frame, positions of pixels from which the pixel mixture signals corresponding to the fourth image which is to be read out are obtained, as indicated in the first regions 480, 481, and 482 shown in FIG. 18B to FIG. 18D.

(Embodiment 6)

An embodiment 6 is different from the embodiment 1 in that an image capture apparatus according to the present embodiment includes an image compression unit, an image synthesis unit, and a fourth image compression unit.

Figure 19:
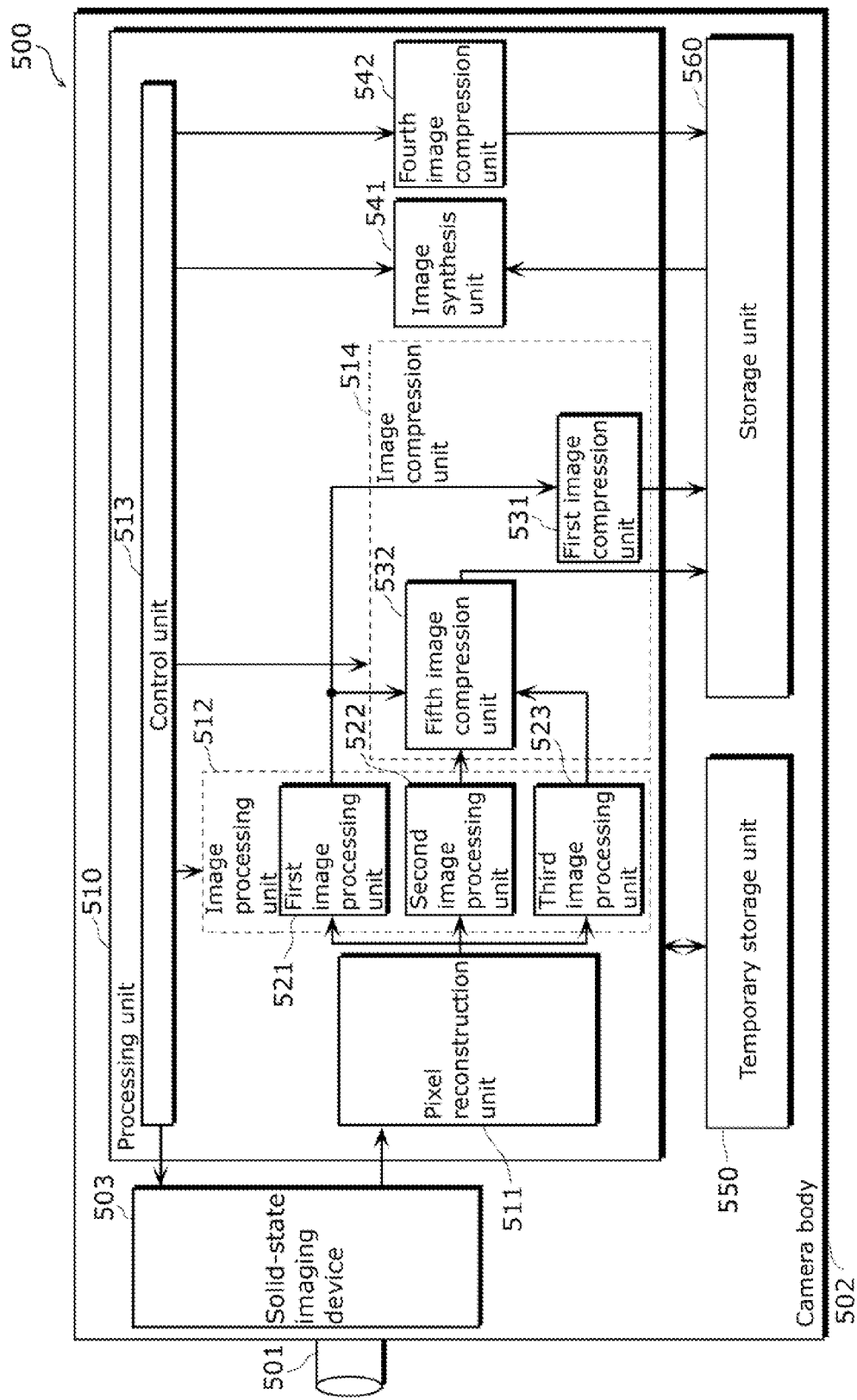
FIG. 19 is a block diagram of an image capture apparatus according to an embodiment 6 of the present invention.

FIG. 19 is a block diagram of an image capture apparatus 500 according to the present embodiment.

As shown in FIG. 19, the image capture apparatus 500 is, as similar to the embodiment 1, an image capture apparatus which includes an imaging lens 501 and a camera body 502. Moreover, the camera body 502 includes a solid-state imaging device 503, a processing unit 510, a temporary storage unit 550, and a storage unit 560. A subject image imaged by the imaging lens 501 is converted into pixel signals by the solid-state imaging device 503 and the pixel signals are sent to the processing unit 510.

The processing unit 510 includes a pixel reconstruction unit 511, an image processing unit 512, a control unit 513, an image compression unit 514, an image synthesis unit 541, and a fourth image compression unit 542.

The control unit 513 controls operations of the solid-state imaging device 503, the image processing unit 512, the image compression unit 514, the image synthesis unit 541, and the fourth image compression unit 542.

Moreover, the temporary storage unit 550 is a work memory and used for temporarily storing therein the image signals in generating an image by the processing unit 510. Moreover, the storage unit 560 stores therein the image generated by the processing unit 510.

The image processing unit 512 includes a first image processing unit 521, a second image processing unit 522, and a third image processing unit 523. The image compression unit 514 includes a first image compression unit 531 and a fifth image compression unit 532. Similarly to the embodiment 1, a first pixel mixture signal, a second pixel mixture signal, and a third pixel mixture signal which are outputted from the pixel reconstruction unit 511 are converted into a first image signal, a second image signal, and a third image signal by the first image processing unit 521, the second image processing unit 522, and the third image processing unit 523, respectively. Then, the first image signal is sent to the first image compression unit 531 of the image compression unit 514, the first image signal, the second image signal, and the third image signal are sent to the fifth image compression unit 532 of the image compression unit 514, and the first image signal, the second image signal, and the third image signal undergo compression transform into JPEG data, MPEG data, MPEG4 data, or the like, and the resultant data is stored in the storage unit 560.

Here, the present embodiment is different from the embodiment 1 in that the fifth image compression unit 532 generates a differential signal from the first image signal, the second image signal, and the third image signal, and compression encodes the generated differential signal. Specifically, the fifth image compression unit 532 generates a first differential signal which is a difference between the first image and the second image and a second differential signal which is a difference between the first image and the third image, and compression encodes the generated first differential signal and the generated second differential signal by the fourth image compression unit 542.

Figure 20:
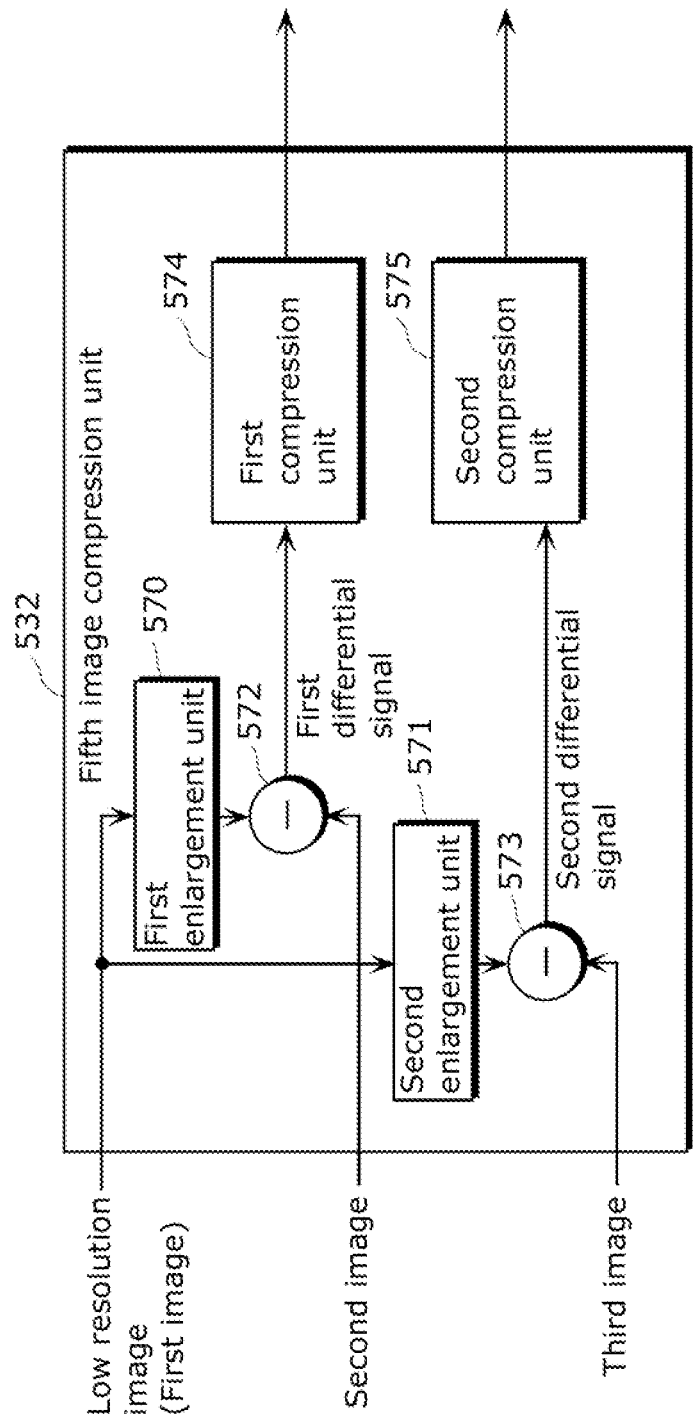
FIG. 20 is a block diagram of a fifth image compression unit.

The configuration of the fifth image compression unit 532 is shown in FIG. 20. Moreover, FIG. 21 shows an operational view of forming an image which is obtained by compressing the first differential signal which is the difference between the first image and the second image.

As shown in FIG. 20, the fifth image compression unit 532 includes a first enlargement unit 570, a second enlargement unit 571, subtractors 572 and 573, a first compression unit 574, and a second compression unit 575.

Figure 21:
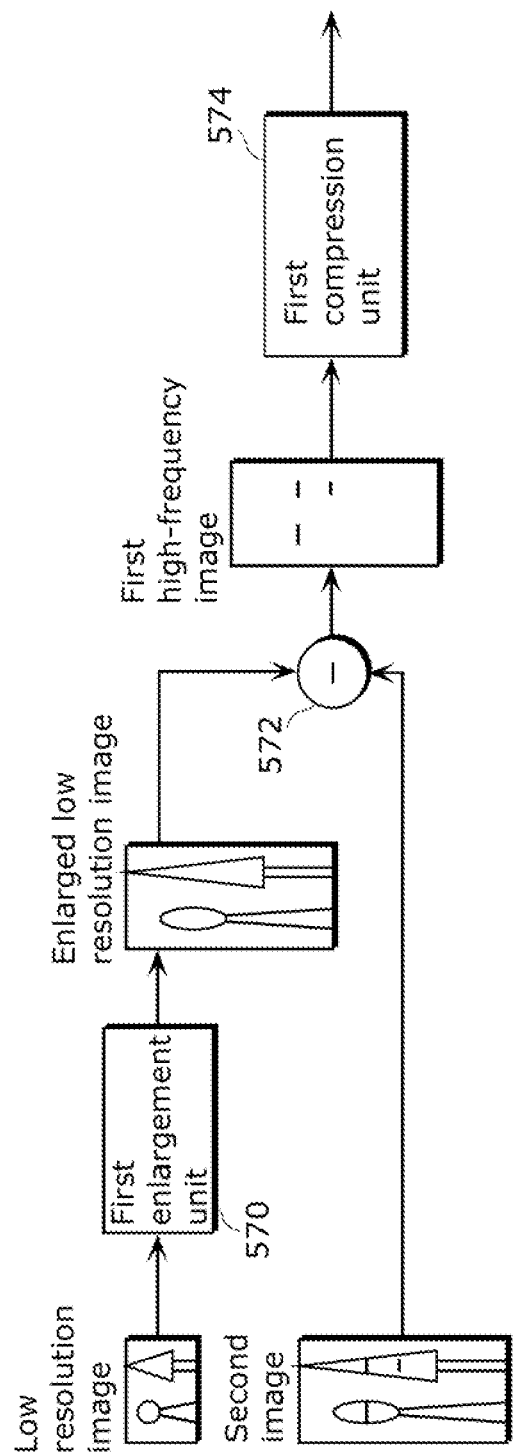
FIG. 21 is a diagram showing an operation by the fifth image compression unit.

As shown in FIG. 21, the fifth image compression unit 532 generates an enlarged low resolution image which is obtained by enlarging the low resolution image (the first image) to the image size of the second image by the first enlargement unit 570, and generates, by the subtractor 572, the first differential signal, which constructs a first high-frequency image, from a difference between the enlarged low resolution image and the second image. Next, the fifth image compression unit 532 compresses the first differential signal by the first compression unit 574.

Likewise, with respect to the third image also, the fifth image compression unit 532 generates an enlarged low resolution image which is obtained by enlarging the low resolution image (the first image) to the image size of the third image by the second enlargement unit 571, and generates, by the subtractor 573, the second differential signal, which constructs a second high-frequency image, from a difference between the enlarged low resolution image and the third image. Next, the fifth image compression unit 532 compresses the second differential signal by the second compression unit 575.

This allows the redundancy of information (DC component) commonly included in the first image, the second image, and the third image to be eliminated and the compression efficiency to increase.

The high resolution image generated by compressing the first differential signal and the second differential signal thereafter undergo a synthetic process in time axis alignment at the same time when outputted from the image synthesis unit 541, and are further compression transformed by the fourth image compression unit 542. Thus, a super high resolution image is generated.

(Embodiment 7)

An embodiment 7 is different from the embodiment 1 in that an image capture apparatus according to the present embodiment includes a pixel mixing unit instead of the pixel reconstruction unit.

Figure 22:
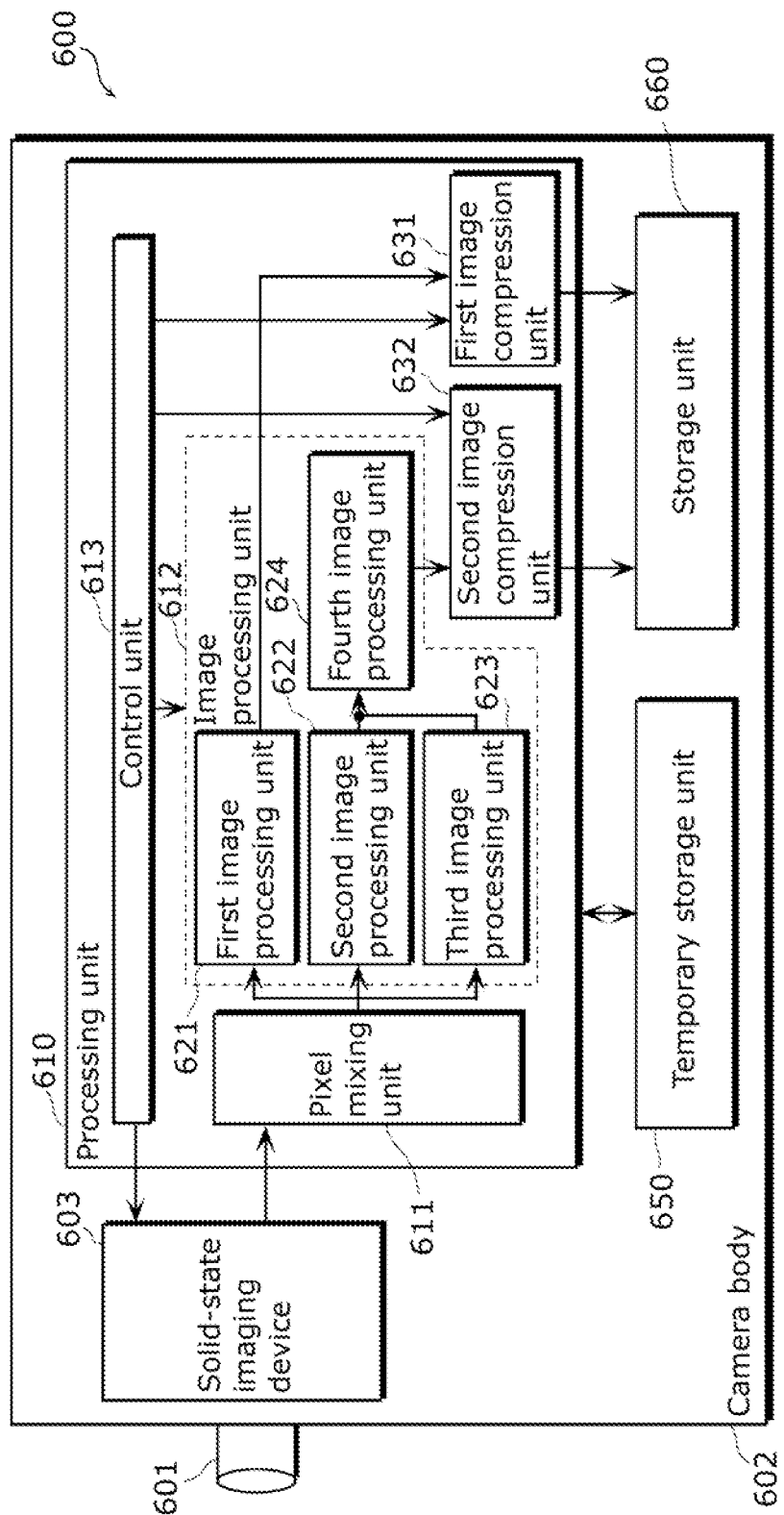
FIG. 22 is a block diagram of an image capture apparatus according to an embodiment 7 of the present invention.
Figure 26:
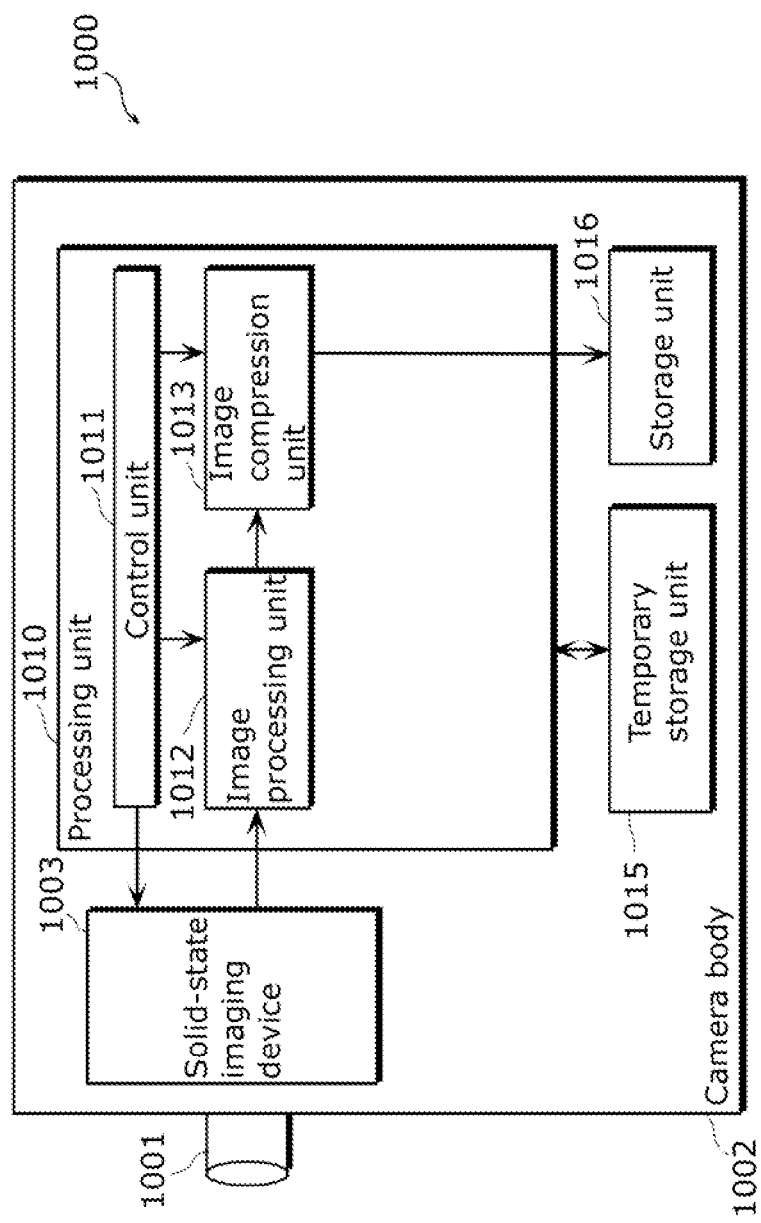
FIG. 26 is a block diagram of a conventional image capture apparatus.
Figure 27:
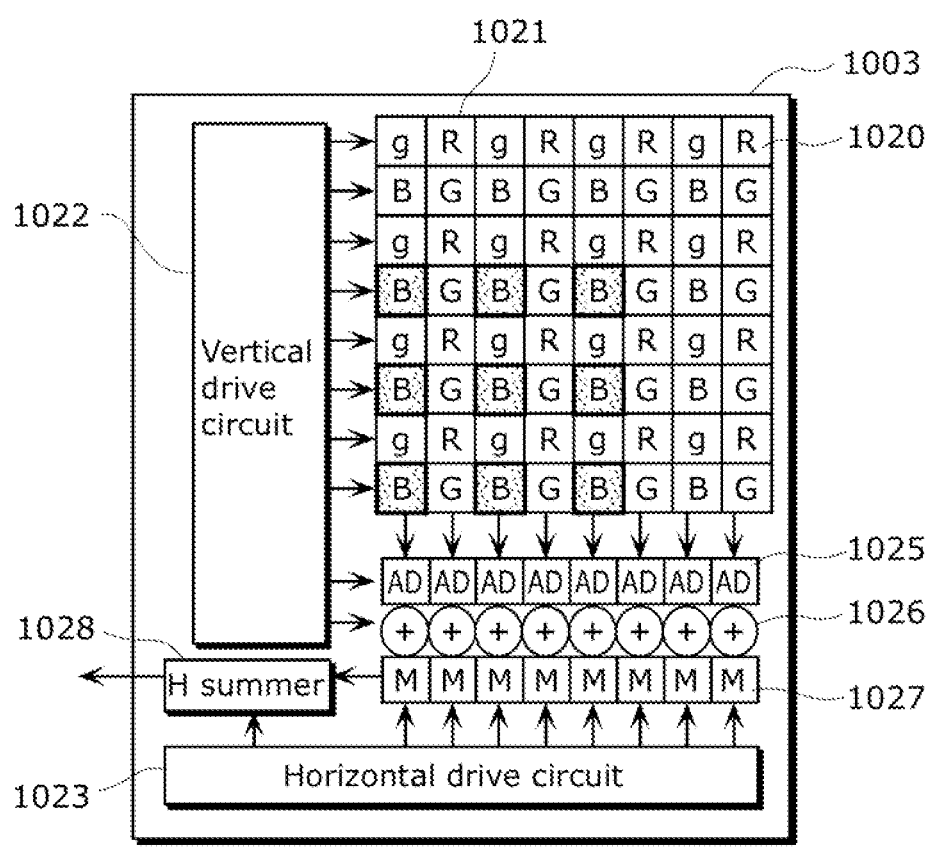
FIG. 27 is a block diagram of a conventional solid-state imaging device.
Figure 29:
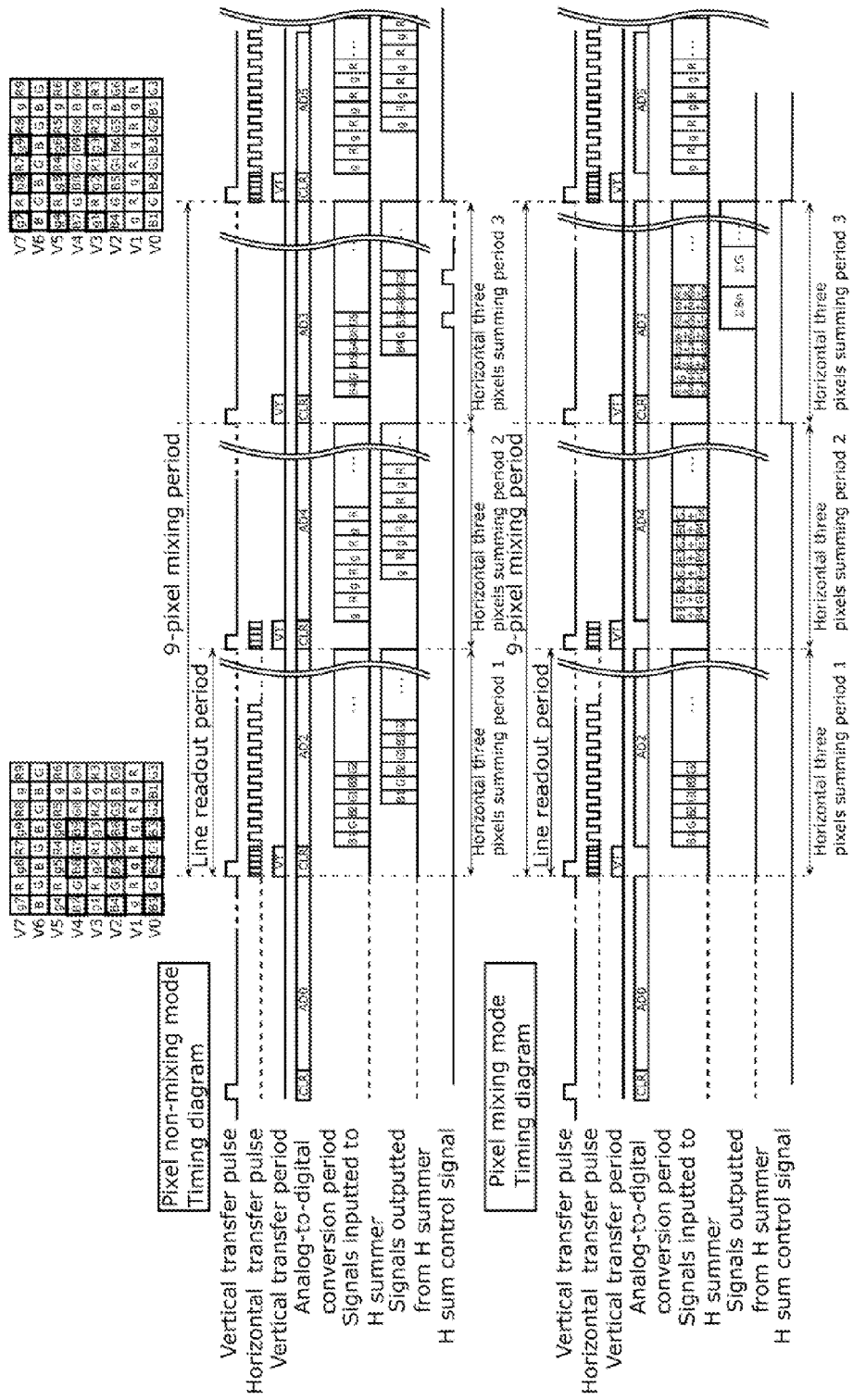
FIG. 29 shows timing diagrams illustrating conventional operations for outputting a pixel mixture signal.

FIG. 22 is a block diagram of an image capture apparatus 600 according to the present embodiment.

As shown in FIG. 22, the image capture apparatus 600 is, as similar to the embodiment 1, an image capture apparatus which includes an imaging lens 601 and a camera body 602. Moreover, the camera body 602 includes a solid-state imaging device 603, a processing unit 610, a temporary storage unit 650, and a storage unit 660. A subject image imaged by the imaging lens 601 is converted into pixel signals by the solid-state imaging device 603 and the pixel signals are sent to the processing unit 610.

The processing unit 610 includes a pixel mixing unit 611, an image processing unit 612, a control unit 613, a first image compression unit 631, and a second image compression unit 632.

The pixel mixing unit 611 mixes the pixel signals of the pixels 150 outputted from the solid-state imaging device 603 to generate a first pixel mixture signal, a second pixel mixture signal, and a third pixel mixture signal. Here, the first pixel mixture signal, the second pixel mixture signal, and the third pixel mixture signal are pixel mixture signals obtained by mixing the pixel signals in a first region including a predetermined number of pixels 150 in the solid-state imaging device 603, a second region in the first region, and a third region in the first region, respectively.

The control unit 613 controls operations of the solid-state imaging device 603, the image processing unit 612, the first image compression unit 631, and the second image compression unit 632.

Moreover, the temporary storage unit 650 is a work memory and used for temporarily storing therein the image signals in generating an image by the processing unit 610. Moreover, the storage unit 660 stores therein the image generated by the processing unit 610.

The image processing unit 612 includes a first image processing unit 621, a second image processing unit 622, a third image processing unit 623, and a fourth image processing unit 624. Here, a first pixel mixture signal, a second pixel mixture signal, and a third pixel mixture signal which are outputted from the pixel mixing unit 611 are converted into a first image signal, a second image signal, and a third image signal by the first image processing unit 621, the second image processing unit 622, and the third image processing unit 623, respectively. The second image signal and the third image signal are further converted into a fourth image signal by the fourth image processing unit 624. Then, the first image signal and the fourth image signal are compression transformed into JPEG data, MPEG data, MPEG4 data, or the like by the first image compression unit 631 and the second image compression unit 632, respectively, and the resultant data is stored in the storage unit 660.

Here, in the present embodiment, the processing unit 610 incorporates the pixel mixing unit 611 instead of the pixel reconstruction unit 111 of the embodiment 1. That is, in the present embodiment, the pixel mixing is performed in the pixel mixing unit 611 provided in the processing unit 610. This obviates the need of performing the pixel mixing in the solid-state imaging device 603, thereby achieving reduced throughput, decreased power consumption, and miniaturization of the solid-state imaging device 603 even in image capture apparatuses using solid-state imaging devices that have no pixel mixing functionality.

(Embodiment 8)

An embodiment 8 is different from the embodiment 1 in that an image capture apparatus according to the present embodiment mixes pixel signals of pixels having three different color filters R, G, and B.

Figure 23:
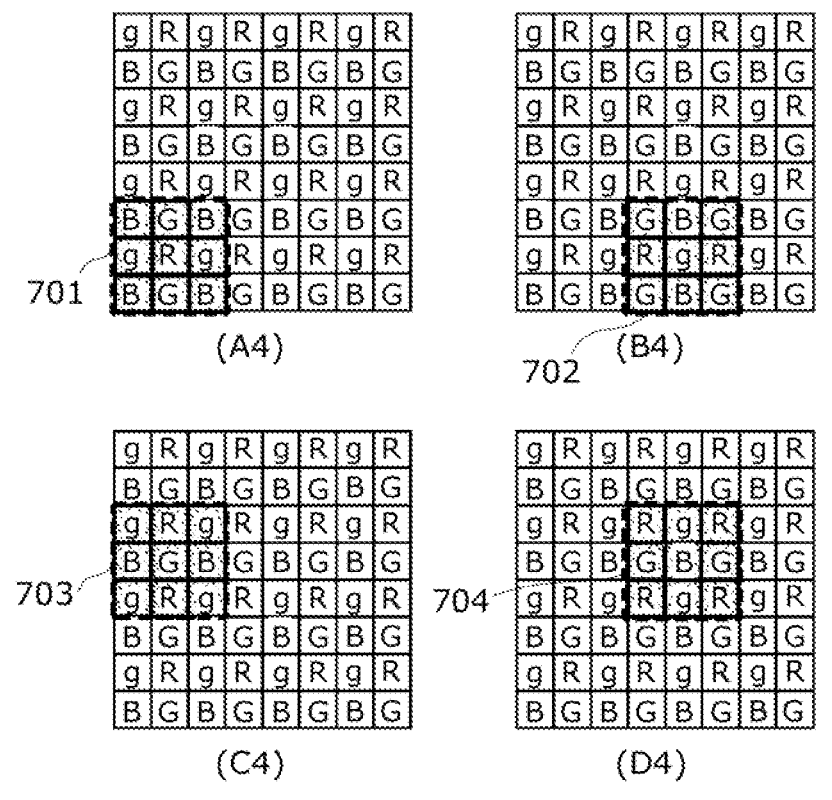

FIG. 23 shows an example of readout of the pixel signals of the solid-state imaging device in a 9-pixel mixing mode in the present embodiment (hereinafter, referred to as second 9-pixel mixing mode) in capturing video images. Here, the image capture apparatus 100 according to the embodiment 1 shown in FIG. 1 mixes and reads out pixels having three different color filters R, G, and B.

In the second 9-pixel mixing mode, for example, upon readout shown in (A4) of FIG. 23, four of the pixels B, two of the pixels G, two of the pixels g, and one pixel R in a first region 701 are summed and outputted. Moreover, as shown in (B4), (C4), and (D4) of the figure, with respect to the pixels corresponding to the arrangement of other color filters, pixel mixture signals of nine pixels in first regions 702, 703, and 704 are each generated and outputted from the solid-state imaging device 103 in the same manner.

Figure 24:
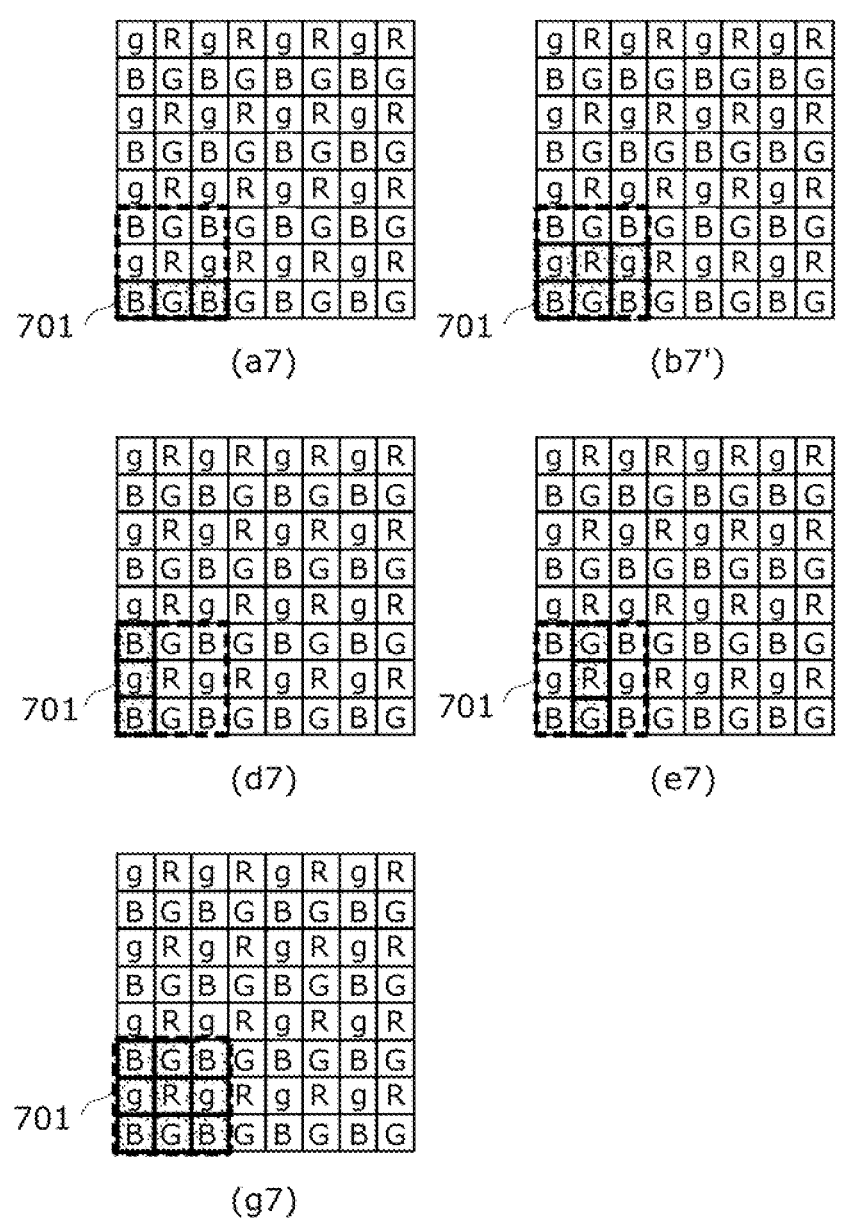

FIG. 24 shows arrays of mixed pixels of the pixel mixture signals outputted by the solid-state imaging device 103 according to the present embodiment. R, G, and B shown in the figure indicate pixels having color filters R, G, and B, respectively. Moreover, g indicates G on the column for R. Moreover, the figure shows the pixel mixture signals in the solid-state imaging device 103 in which the first region is formed of M×M pixels, the second region is formed of n×M pixels, and the third region is formed of M×n pixels where M=3 and n=1. M denotes a positive integer represented by n×α, where n is an integer greater than or equal to 1 and α is an integer greater than or equal to 2. Moreover, here, α=3 is satisfied. That is, regions indicated by dotted lines in the figure are each the first region 701 which includes nine pixels having the color filter B, a region which includes three pixels (a combination of three pixels B, G, and B, or a combination of three pixels g, R, and g) in the row direction in each first region 701 is the second region, and a region which includes three pixels (a combination of three pixels B, G, and B, or a combination of three pixels g, R, and g) in the column direction in the first region 701 is the third region. Moreover, three of the second regions are disposed in the column direction in the first region 701 and three of the third regions are disposed in the row direction in the first region 701. FIG. 24 only shows (A4) of FIG. 23. However, each combination (B4) to (D4) is disposed in the same manner.

As shown in FIG. 24, in the present embodiment, with respect to nine pixels in the first region 701 indicated by the dotted line, the solid-state imaging device 103 outputs the pixel mixture signals each obtained by mixing the pixel signals of the pixels in five arrays including the following numbers of pixels in the horizontal and vertical directions, (a7) 3×1 pixels, (b7') 3×2 pixels, (d7) 1×3 pixels, (e7) 1×3 pixels, and (g7) 3×3 pixels. Specifically, the solid-state imaging device 103 outputs: the second pixel mixture signal obtained by mixing the pixel signals of three pixels in the second region shown in (a7); the fourth pixel mixture signal obtained by mixing the pixel signals of six pixels in two of the second regions shown in (b7'); the third pixel mixture signals obtained by mixing the pixel signals of three pixels in the third regions each shown in (d7) and (e7); and the first pixel mixture signal obtained by mixing the pixel signals of nine pixels in the first region 701 shown in (g7).

Moreover, pixel mixture signals present in regions that are not outputted from the solid-state imaging device 103 are reconstructed from the pixel mixture signals of the aforementioned five types by the following conversions equations.

(a7)=(a7)

(b7)=(b7')−(a7)

(c7)=(g7)−(b7')

(d7)=(d7)

(e7)=(e7)

(f7)=(g7)−(d7)−(e7)

(g7)=(g7)

Figure 25:
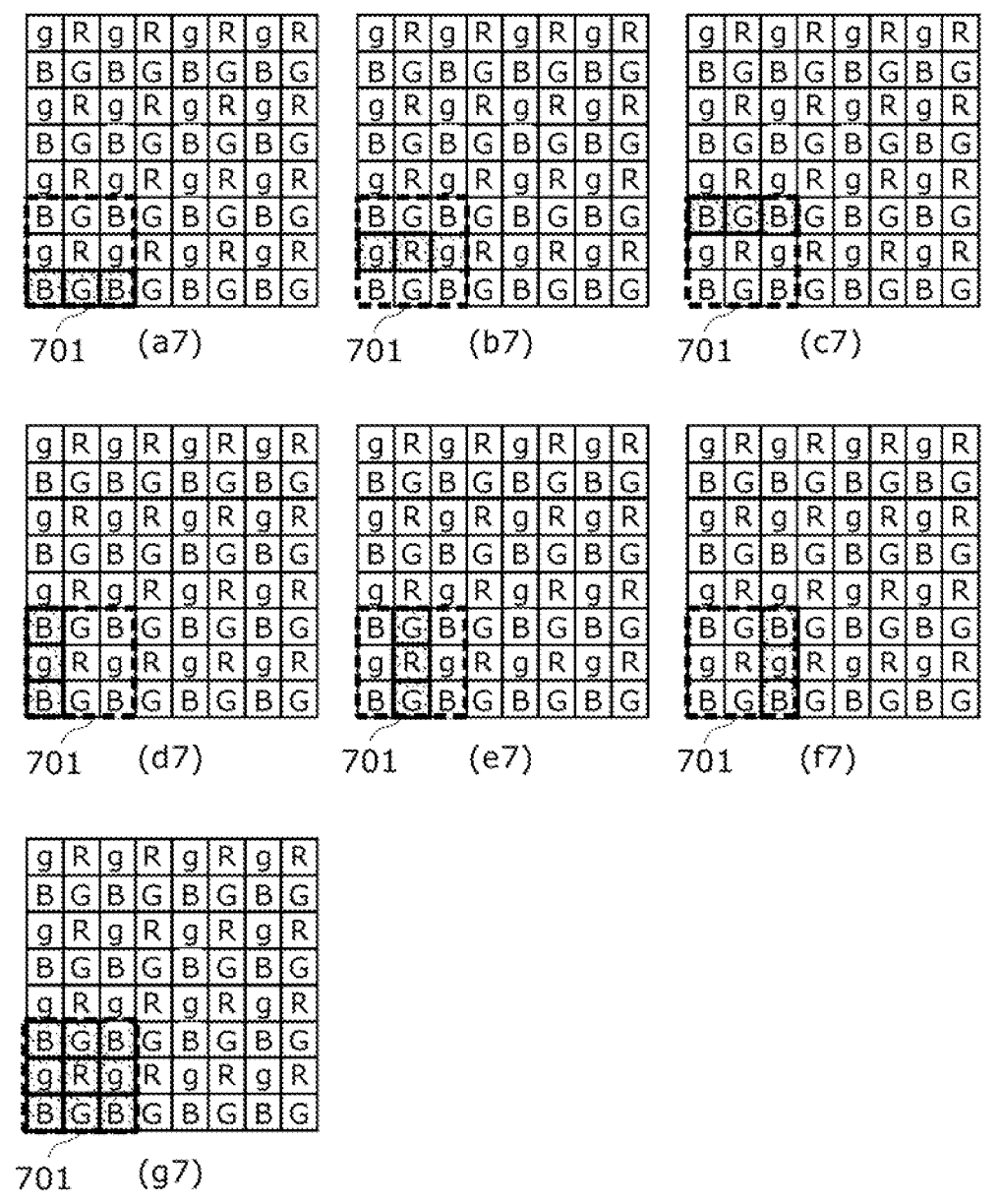

This allows pixel mixture signals of seven types (a7) to (g7) which are shown in FIG. 25 to be obtained.

In FIG. 25, (g7) shows the mixed pixels of the first region, (a7), (b7), and (c7) show the mixed pixels of the second regions, and (d7), (e7), and (f7) show the mixed pixels of the third regions. Alternatively, the solid-state imaging device 103 may output a fifth pixel mixture signal obtained by mixing the pixel signals in a plurality of the third regions in the manner as outputting the fourth pixel mixture signal that is obtained by mixing the pixel signals in two of the second regions in (b7').

Due to the array of 3×3 pixels (g7) shown in FIG. 25, a low resolution image (the first image) can be obtained in the same manner as in the conventional video mode. Here, since the first pixel mixture signal is an image signal generated using all pixel signals in the first region 701, the first pixel mixture signal allows an image having no distortion or alternation in color of the image in row and column directions to be obtained even if the image has low resolution.

Moreover, in (a7) to (c7) of FIG. 25, the second pixel mixture signals each obtained by mixing the pixel signals of three pixels disposed on the same row in the second region are generated. That is, in each second region, the second pixel mixture signal in which the pixel signals in the row direction are decimated is generated. Then, performing the image processing on the second pixel mixture signals shown in (a7) to (c7) generates an image (the second image) which has the same vertical resolution as an image that is obtained without performing the pixel mixing described above. The second image is obtained in the way of decimating the pixel signals in the row direction, and thus is an image that has short sides in the row direction and long sides in the column direction.

Likewise, in (d7) to (f7) in FIG. 5, the third pixel mixture signal obtained by mixing the pixel signals of three pixels disposed on the same column in the third region is generated. That is, in each third region, the third pixel mixture signal in which the pixel signals in the column direction are decimated is generated. Then, performing the image processing on the third pixel mixture signals shown in (d7) to (f7) generates an image (the third image) which has the same horizontal resolution as an image that is obtained without performing the pixel mixing described above. The third image is obtained in the way of decimating the pixel signals in the column direction, and thus is an image that has short sides in the column direction and long sides in the row direction.

Furthermore, the first image, the second image, and the third image described above are generated from the pixel signals that are exposed at the same timing. Thus, synthesizing the second image and the third image concurrently with generating a low resolution image (the first image) for video image as in the same manner as with the conventional video mode generates the high resolution image (the fourth image) for still image which is similar to an image that is obtained without performing the pixel mixing.

Moreover, in addition to the case of the color B, the low resolution image and the high resolution image can be generated in the same manner with respect to the other colors R, G, and g.

In the pixel mixing mode shown in the present embodiment, pixels having different color filters are mixed and read out instead of separating the pixels R, G, and B from one another and reading out the pixels. However, as shown in FIG. 23, since there are four combinational methods for mixing the pixels R, G, and B, the pixels R, G, and B can be ultimately separated from one another. Thus, the same effects as those from the embodiment 1 can be obtained.

The present invention is not limited to the foregoing embodiments, and various other modifications and variations can be devised without departing from the scope of the invention.

For example, how the pixels are disposed in the first region, the second region, and the third region may be different irrespective of the number of the pixels and the disposition of the pixels that are described above.

Moreover, the processing unit of the image capture apparatus according to the present invention is not limited to the embodiments described above, and may have any configuration. For example, the image processing unit, the image compression unit, the image synthesis unit, and the image decoding unit may be added to the configuration, or the combination thereof may be modified and added to the configuration.

Moreover, other embodiments achieved by combining any components of the above embodiments, modifications obtained by various modifications to the present embodiments that may be conceived by those skilled in the art, and various devices which include the image capture apparatus according to the present invention are included in the scope of the image capture apparatus according to the present invention. For example, movie cameras which include the image capture apparatus according to the present invention are included in the scope of the present invention.

Industrial Applicability

The present invention is an image capture apparatus applicable to mobile cameras such as integrated video cameras, digital still cameras, and movie cameras, and is particularly applicable, as an image capture apparatus which allows acquisition of high definition images even if the number of pixels to be read out is reduced, to network cameras such as observation cameras and WEB cameras and car-mounted cameras such as vehicle cameras and in-car video cameras.

The invention claimed is:

1. An image capture apparatus comprising:
a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals;
a first image processing unit configured to generate a first image from the first pixel mixture signals;
a second image processing unit configured to generate a second image from the second pixel mixture signals;
a third image processing unit configured to generate a third image from the third pixel mixture signals; and
a fourth image processing unit configured to generate a fourth image, which is a high resolution image, from at least two images selected from among the first image, the second image, and the third image,
wherein the second regions are disposed in a column direction in the first region and each second region has, in a row direction, a same number of pixels as a number of pixels in the row direction in the first region, and
the third regions are disposed in the row direction in the first region and each third region has, in the column direction, a same number of pixels as a number of pixels in the column direction in the first region.

2. The image capture apparatus according to claim 1, wherein said solid-state imaging device:
generates fourth pixel mixture signals each obtained by mixing at least two of the second pixel mixture signals; and
concurrently outputs the one of the first pixel mixture signals, at least one of the second pixel mixture signals, at least one of the third pixel mixture signals, and at least one of the fourth pixel mixture signals.

3. The image capture apparatus according to claim 1, wherein said solid-state imaging device:
generates fifth pixel mixture signals each obtained by mixing at least two of the third pixel mixture signals; and
concurrently outputs the one of the first pixel mixture signals, at least one of the second pixel mixture signals, at least one of the third pixel mixture signals, and at least one of the fifth pixel mixture signals.

4. The image capture apparatus according to claim 1, wherein said solid-state imaging device:
generates at least one of fourth pixel mixture signals each obtained by mixing at least two of the second pixel mixture signals;
generates at least one of fifth pixel mixture signals each obtained by mixing at least two of the third pixel mixture signals; and
concurrently outputs the one of the first pixel mixture signals, at least one of the second pixel mixture signals, at least one of the third pixel mixture signals, at least one of the fourth pixel mixture signals, and at least one of the fifth pixel mixture signals.

5. The image capture apparatus according to claim 1, comprising
a pixel reconstruction unit configured to generate, from the one of the first pixel mixture signals, the second pixel mixture signals, and the third pixel mixture signals that are outputted, the second pixel mixture signals and the third pixel mixture signals that are not outputted.

6. The image capture apparatus according to claim 2, comprising
a pixel reconstruction unit configured to generate, from the one of the first pixel mixture signals, the second pixel mixture signals, the third pixel mixture signals, and the fourth pixel mixture signals that are outputted, the second pixel mixture signals and the third pixel mixture signals that are not outputted.

7. The image capture apparatus according to claim 3, comprising
a pixel reconstruction unit configured to generate, from the one of the first pixel mixture signals, the second pixel mixture signals, the third pixel mixture signals, and the fifth pixel mixture signals that are outputted, the second pixel mixture signals and the third pixel mixture signals that are not outputted.

8. The image capture apparatus according to claim 4, comprising
a pixel reconstruction unit configured to generate, from the one of the first pixel mixture signals, the second pixel mixture signals, the third pixel mixture signals, the fourth pixel mixture signals, and the fifth pixel mixture signals that are outputted, the second pixel mixture signals and the third pixel mixture signals that are not outputted.

9. The image capture apparatus according to claim 1, wherein said fourth image processing unit includes:
a first enlargement unit configured to enlarge the second image inputted from said second image processing unit, to generate a first enlarged image;
a second enlargement unit configured to enlarge the third image inputted from said third image processing unit, to generate a second enlarged image;
a first contrast calculation unit configured to calculate, with respect to pixels of the first enlarged image, first contrast of image signals of a pixel and pixels surrounding the pixel; and
a second contrast calculation unit configured to calculate, with respect to pixels of the second enlarged image, second contrast of image signals of a pixel and pixels surrounding the pixel,
the first enlarged image and the second enlarged image have a same size, and
based on a contrast value of the first contrast of a pixel at each one of predetermined positions in the first enlarged image and a contrast value of the second contrast of a pixel at a position which corresponds to the one predetermined position and is in the second enlarged image, an image signal of the first enlarged image or the second enlarged image that has a larger contrast value is selected to generate a new high resolution image.

10. The image capture apparatus according to claim 1, wherein said fourth image processing unit includes:
a first enlargement unit configured to enlarge the second image outputted from said second image processing unit, to generate a first enlarged image;
a second enlargement unit configured to enlarge the third image outputted from said third image processing unit, to generate a second enlarged image;
a first contrast calculation unit configured to calculate, with respect to pixels of the first enlarged image, first contrast of image signals of a pixel and pixels surrounding the pixel; and
a second contrast calculation unit configured to calculate, with respect to pixels of the second enlarged image, second contrast of image signals of a pixel and pixels surrounding the pixel,
the first enlarged image and the second enlarged image have a same size, and
in accordance with a ratio between the first contrast of a pixel at each one of predetermined positions in the first enlarged image and the second contrast of a pixel at a position which corresponds to the predetermined position and is in the second enlarged image, an image signal of the first enlarged image and an image signal of the second enlarged image are mixed to generate a new high resolution image.

11. The image capture apparatus according to claim 10, wherein based on a contrast value Ca of the first contrast and a contrast value Cb of the second contrast, an image signal Pa of the first enlarged image and an image signal Pb of the second enlarged image, said fourth image processing unit is configured to generate an image signal Pnew for a high resolution image satisfying:

$$Pnew = T1[Ca, Cb] \times Pa + T2[Ca, Cb] \times Pb,$$

where $T1[Ca, Cb] + T2[Ca, Cb] = 1$, and T1 and T2 are constants that depend on Ca and Cb, respectively.

12. The image capture apparatus according to claim 1, wherein in said solid-state imaging device,
given that M is a positive integer represented by n×α, n is an integer greater than or equal to 1, and α is an integer greater than or equal to 2,
the first region is formed of M×M pixels, the second region is formed of n×M pixels, and the third region is formed of M×n pixels.

13. The image capture apparatus according to claim 1, wherein when a plurality of images are captured for frames continuous in time, a position of each first region in each image is sequentially changed for each frame.

14. The image capture apparatus according to claim 1, wherein the first pixel mixture signals, the second pixel mixture signals, and the third pixel mixture signals are each generated for each one of colors.

15. An image capture apparatus comprising:
a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals;
a first image processing unit configured to generate a first image from the first pixel mixture signals;
a second image processing unit configured to generate a second image from the second pixel mixture signals;
a third image processing unit configured to generate a third image from the third pixel mixture signals;
a first image compression unit configured to compress the first image;
a second image compression unit configured to compress the second image; and
a third image compression unit configured to compress the third image,
wherein the second regions are disposed in a column direction in the first region and each second region has, in a row direction, a same number of pixels as a number of pixels in the row direction in the first region, and
the third regions are disposed in the row direction in the first region and each third region has, in the column direction, a same number of pixels as a number of pixels in the column direction in the first region.

16. An image capture apparatus comprising:
a solid-state imaging device which includes a plurality of pixels disposed in rows and columns, generates: first pixel mixture signals each obtained by mixing pixel signals for a first region including a predetermined number of the pixels; second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals;
a first image processing unit configured to generate a first image from the first pixel mixture signals;
a second image processing unit configured to generate a second image from the second pixel mixture signals;

a third image processing unit configured to generate a third image from the third pixel mixture signals;
a first compression unit configured to compress a first differential signal which is a difference between the first image and the second image; and
a second compression unit configured to compress a second differential signal which is a difference between the first image and the third image,
wherein the second regions are disposed in a column direction in the first region and each second region has, in a row direction, a same number of pixels as a number of pixels in the row direction in the first region, and
the third regions are disposed in the row direction in the first region and each third region has, in the column direction, a same number of pixels as a number of pixels in the column direction in the first region.

17. An image capture apparatus comprising:
a solid-state imaging device which includes a plurality of pixels disposed in rows and columns,
a pixel mixing unit configure to generate from pixel signals outputted from said solid-state imaging device: first pixel mixture signals each obtained by mixing pixel signals for a first region including a predetermined number of the pixels;
second pixel mixture signals each obtained by mixing pixel signals for a second region in the first region; and third pixel mixture signals each obtained by mixing pixel signals for a third region in the first region, and outputs, for each first region, one of the first pixel mixture signals, at least one of the second pixel mixture signals, and at least one of the third pixel mixture signals;
a first image processing unit configured to generate a first image from the first pixel mixture signals;
a second image processing unit configured to generate a second image from the second pixel mixture signals;
a third image processing unit configured to generate a third image from the third pixel mixture signals; and
a fourth image processing unit configured to generate a fourth image, which is a high resolution image, from at least two images selected from among the first image, the second image, and the third image,
wherein the second regions are disposed in a column direction in the first region and each second region has, in a row direction, a same number of pixels as a number of pixels in the row direction in the first region, and
the third regions are disposed in the row direction in the first region and each third region has, in the column direction, a same number of pixels as a number of pixels in the column direction in the first region.

* * * * *